INVENTORS
HENRY A. ERNST
MEIR M. LEHMAN
JACK L. ROSENFELD
HANS P. SCHLAEPPI
BY Isidore Match
ATTORNEY Feb. 2, 1971 H. A. ERNST ET AL 3,560,934

ARRANGEMENT FOR EFFECTING VECTOR MODE OPERATION IN MULTIPROCESSING SYSTEMS

Filed June 10, 1969 24 Sheets-Sheet 3

Feb. 2, 1971 H. A. ERNST ET AL 3,560,934

ARRANGEMENT FOR EFFECTING VECTOR MODE OPERATION IN MULTIPROCESSING SYSTEMS

Filed June 10, 1969 24 Sheets-Sheet 4

Feb. 2, 1971 H. A. ERNST ET AL 3,560,934

ARRANGEMENT FOR EFFECTING VECTOR MODE OPERATION
IN MULTIPROCESSING SYSTEMS

Filed June 10, 1969 24 Sheets-Sheet 11

Feb. 2, 1971 H. A. ERNST ET AL 3,560,934

ARRANGEMENT FOR EFFECTING VECTOR MODE OPERATION IN MULTIPROCESSING SYSTEMS

Filed June 10, 1969 24 Sheets-Sheet 15

United States Patent Office 3,560,934
Patented Feb. 2, 1971

3,560,934

ARRANGEMENT FOR EFFECTING VECTOR MODE OPERATION IN MULTIPROCESSING SYSTEMS

Henry A. Ernst, Pleasantville, Meir M. Lehman, Bronx, Jack L. Rosenfeld, Tarrytown, and Hans P. Schlaeppi, Chappaqua, N.Y., assignors to International Business Machines Corporation, Armonk, N.Y., a corporation of New York Filed June 10, 1969, Ser. No. 831,897
Int. Cl. G06f *9/18, 9/19*
U.S. Cl. 340—172.5 20 Claims

ABSTRACT OF THE DISCLOSURE

A program controlled transition of the mode of operation of a multiprocessor system, from the normal multiprocessing mode (independent execution of distinct instruction sequences or tasks by a plurality of processors) to the vector mode (synchronous execution of identical instruction sequences or vector task by a plurality of processors) is effected by the execution of a special instruction by one one of the processors engaged in a multiprocessing task, which thereby becomes the so-called originating processor of a vector task. In executing this special instruction, the originating processor acquires control over a specified number of the other processors that have so far been executing independent task, causing them to interrupt the tasks they are engaged in, and then to participate in the incipient vector task. In a set of processors participating in a vector task, the originating processor alone fetches instructions from storage, distributing them to the other participating processors. The instruction sequencing mechanism of each one of the other participating processors, while required in the normal multiprocessing mode, is disabled for as long as that processor continues in the vector mode. The addressing and indexing mechanisms of all participating processors remain effective in the vector mode, so that each of the processors can fetch data words from storage for its own use. However, data fetching by all participating processors is synchronized by the originating processor. In addition, special instructions intended for use in vector tasks only enable the originating processor to fetch individual data words, copies of which then being distributed to all participating processors. Another special instruction in the vector tasks effects the termination of the vector mode of operation, causing the originating processor to relinquish control over the other participating processors, which thereby become available for reassignment to independent tasks as may currently be on record on the task queue. Thereafter, the originating processor continues the execution of its program in the normal mode of operation.

CROSS-REFERENCES TO RELATED APPLICATIONS

Copending application of Hans P. Schlaeppi for "Control Mechanism for a Multi-Processor Computing System," Ser. No. 607,040, filed Jan. 3, 1967 now Pat. No. 3,480,914 assigned to the present assignee.

Patent of Graham C. Driscoll for "Communication Arrangement in Data Processing System," Ser. No. 653,535, filed July 14, 1967, issued on May 20, 1969, Pat. No. 3,445,822, assigned to the present assignee.

Copending application of Meir M. Lehman, Jack L. Rosenfeld and Hans P. Schlaeppi for "Interlock Arrangement," Ser. No. 742,676, filed July 5, 1968, assigned to the present assignee.

BACKGROUND OF THE INVENTION

This invention relates to data processing systems. More particularly, it relates to a novel organization of data processing systems with enhanced capabilities comprising a plurality of processing units.

Heretofore, to improve the performance of data processing systems, one approach has been to utilize organizations generally referred to as multiprocessors. The latter generally comprise a plurality of processor units which communicate with a relatively large common store through a suitable communication network. If, for example, the common store comprises a plurality of storage modules, the communication network may take the form of a cross-bar switch, combined with queuing facilities for access requests to the modules of the common store.

In a multiprocessor, each processing unit is arranged to operate under control of its own instruction counter. The streams of instructions and data required by the individual processors may all originate from the same common store.

In such multiprocessors, each processing unit can operate on a distinct job or problem. A good deal of problems or jobs lend themselves to partitioning into several sequences of instruction executions, hereinafter termed "tasks," which are substantially independent of each other; if a job can be so partitioned, then several of its tasks may be capable of concurrent execution, giving rise to "parallelism" of execution.

Generally, most of the processor units in a multiprocessor can be kept busy most of the time because the processors not used by one job can be assigned to other jobs. A salient deficiency of such multiprocessor organizations is that individual central processor units will be idle whenever two or more of them simultaneously attempt to access the same storage module. Such storage interference becomes particularly severe, whenever a number of processors concurrently execute the same program loop (using distinct data), which occurs for instance in the parallel processing of arrays. In such cases, performance may be severely degraded.

In a second approach, machine organizations specialized for the processing of arrays of data words have been proposed in which a single stream of instructions controls a plurality of execution units or processors working in unison, as it were in "lock-step." Thus, these execution units execute the same instruction on a set of distinct operands which well be referred to as a "vector." The vector type computer system is advantageously employed for problems such as those that involve the parallel processing of arrays or the parallel computing of the same functions for a set of distinct arguments. However, whenever the problems to be handled to not, or do not efficiently, utilize the vector capability of a computing system, of necessity a subset of execution units are idle. In the worst case, where no vector parallelism exists in a part of an algorithm being processed, all but one of the execution units in a vector-type computing system are idle.

From the foregoing, it is appreciated that vector computing systems are of limited application. However, where their employment is indicated, they are highly efficient. Such efficiency results from the fact that a computing system operating in the vector mode has only to fetch a single instruction stream for all of the central processor units, and that regularly spaced data words are fetched in synchronism by all of the central processor units. Thereby, storage interference is substantially reduced if the data words are distributed over a sufficient number of storage modules in a manner that eliminates or minimizes simultaneous access to one and the same storage module by more than one processor. One way to achieve this is by address interlacing over a bank of storage modules.

It is thus readily apparent that a data processing system which can be operated either in a multiprocessing mode or in a vector mode, the mode transition being effected under program control, presents many advantages and can achieve levels of performance heretofore unattained by known systems.

Accordingly, it is an important object of this invention to provide a data processing system which is flexibly capable of operating both in the multiprocessing and vector modes.

It is another object of the invention to provide a system in accordance with the preceding object wherein transitions between multiprocessing and vector processing modes of operation can be program-controlled.

It is a further object of the invention to provide a system in accordance with the preceding objects which is relatively insensitive to the loss of any particular central processing unit or units by hardware faults, by higher priority requests that must be granted, and by interrupts during vector mode operation.

An important feature of the invention resides in the enabling of a program-controlled transition from the multiprocessing of independent tasks to synchronous control of several processors by a single instruction stream.

Another feature of the invention is the capability of selecting a chosen number of processor units in the system for participation in a vector task while permitting the rest of the processor units to continue in their present tasks. Thus, the vector processing and multiprocessing modes of operation can exist concurrently.

A further feature of the invention imparts independence of the processor set currently engaged in a vector task from the actual identity of each processor participating in that task. Thus, any processor may be the $i$th unit in a vector having a length of $p$, wherein $$0 \leq i \leq (p-1).$$

A still further feature in accordance with the invention is the assignment of a unique vector index to each participating processor, whereby the fetching of data vectors can be controlled.

Still another feature according to the invention is the assignment of responsibility to the processor that executes the instruction effecting the transition to the vector mode for the fetching of vector task instructions on behalf of all of the processing units participating in the particular vector-mode task and for the passing on of these vector task instructions to the instruction registers of each one of the other participating processors. The respective instruction sequencing mechanisms of the latter processors, while required for the multiprocessing mode of operation, are disabled for as long as these processors continue in the vector mode of operation.

SUMMARY OF THE INVENTION

Generally speaking, and in accordance with the invention, an arrangement is provided effecting a transition to the vector mode of operation of a specifiable number of processors in a multiprocessing system which are functioning in the normal mode of operation. The arrangement comprises means contained in each of the processors for enabling them to be respectively switched from the normal to the vector mode and back from the vector mode to the normal mode of operation. The last-named switching means comprises means responsive to an instruction initiating the vector mode of operation, this instruction being part of a program that a processor operating in the normal mode is executing, this instruction being effective for designating the last-named processor as the originating processor for the vector mode of operation, and means responsive to the designation of a processor as the originating processor for selecting a set of other processors that are to participate in the vector mode operation being initiated, and for placing the selected processors into the vector mode of operation. Also included in the switching means are means responsive to the placing of a processor in the vector mode of operation as a participating processor for causing such processor to interrupt the execution of its current task that was progressing in the normal mode and to store the state of this task with appropriate modification of the task queue, and means operative upon the placing of the set of processors into the vector mode of operation for causing the processor designated as the originating processor to fetch the instructions to be executed in the vector mode and for providing the latter instructions to the other participating processors of the set. The switching means further include means responsive to the recognition of the last instruction to be executed in the vector mode of operation for switching the set of processors from the vector mode into the normal multiprocessing mode, the originating processor of the set being enabled thereby to continue the execution of its program in the normal mode, the other participating processors of the set being enabled thereby to be assigned respective tasks from the system task queue.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figure 1:
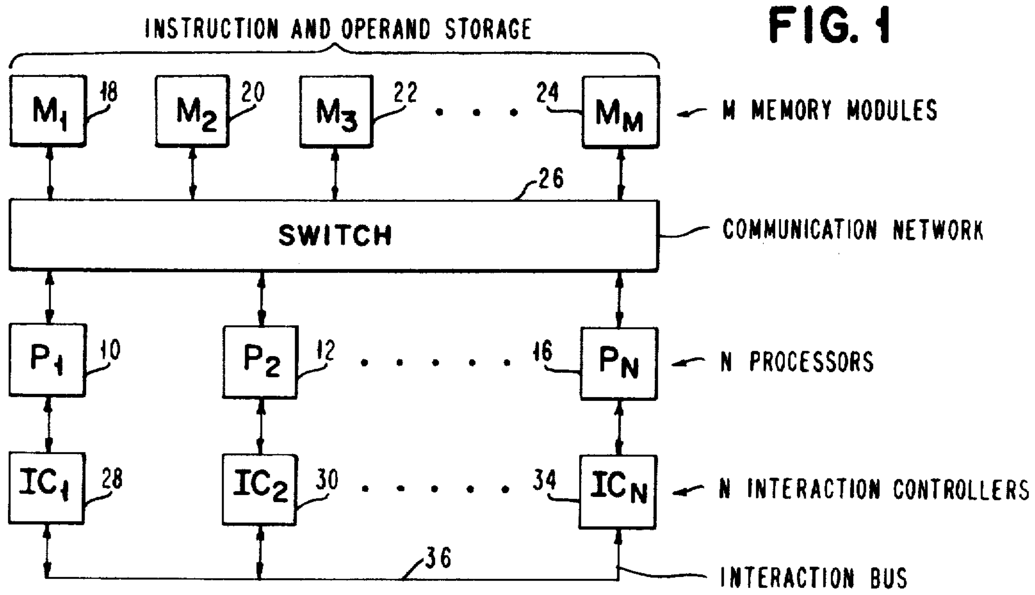
FIG. 1 is a block diagram of an illustrative embodiment of a multiprocessing system constructed in accordance with the principles of the invention and showing the use of a single bank of memory modules for containing both vector instructions and data vectors, and the employment of interaction controllers connected to a common bus for enabling direct communication between the processors of the system.

In FIG. 1 there is shown a system organization comprising N autonomous processors 10, 12 to 16, designated $P_1, P_2 \ldots P_N$, which communicate with a bank of M memory modules 18, 20, 22 to 24, designated $M_1$, $M_2$, $M_3$ . . . $M_M$, by way of a network such as a switch. Processors 10, 12 to 16 each have associated respectively therewith one of interaction controllers 28, 30 to 34 designated $IC_1$, $IC_2$ . . . $IC_N$. The function of the interaction controllers is to enable direct intercommunication between the respective processors without going through the shared memory 18, 20, 22 . . . 24 and, to this end, they are all connected to a common bus 36. The structure and operation of the interaction controllers are disclosed and described in the application of Hans P. Schlaeppi for "Control Mechanism for a Multi-Processor Computing System", Ser. No. 607,040, filed Jan. 3, 1967, now Pat. No. 3,480,914, and the application of Graham C. Driscoll for "Communication Arrangement in Data Processing System," Ser. No. 653,535, filed July 14, 1967, now Pat. No. 3,445,822.

Although the above-mentioned interaction controllers are efficaciously suitable for processor intercommunication, it is, of course, to be realized that other known intercommunication arrangements may be used for this purpose.

In accordance with the principles of the invention, relative to the arrangement shown in FIG. 1, instructions as well as data words are extracted from any or all of the memory modules.

Figure 2:
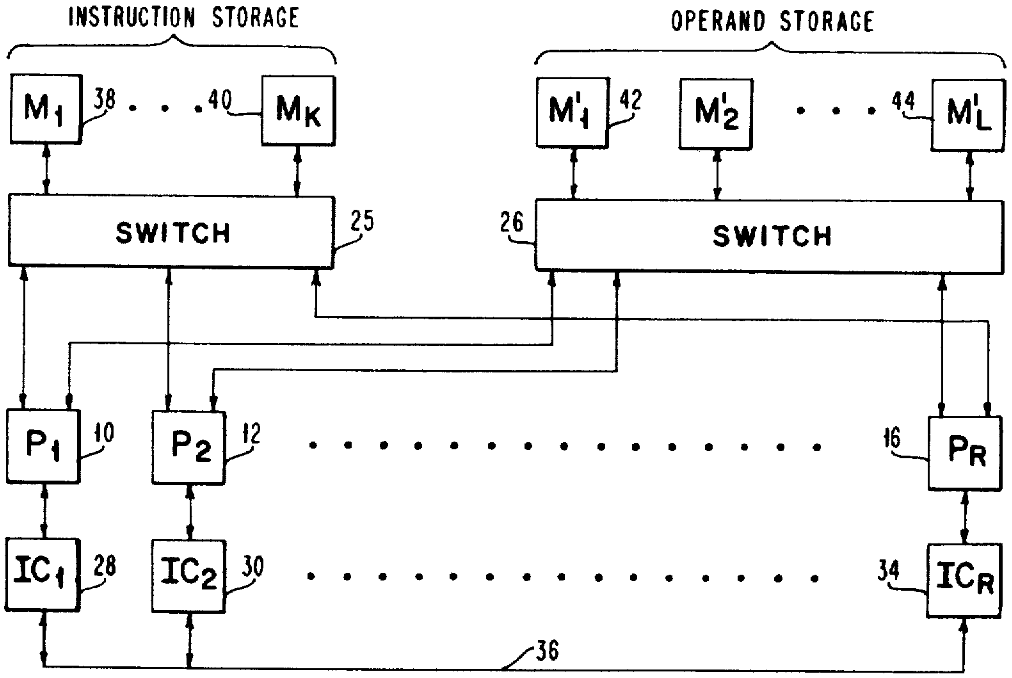
FIG. 2 is similar to FIG. 1 but shows two banks of memory modules, one bank for supplying the instructions for vector tasks, the other for supplying data vectors.

The system organization shown in FIG. 2 is similar to that of FIG. 1 with the difference that two separate banks of memory modules are included. One bank of memory modules 38 to 40 comprising modules $M_1$ . . . $M_K$ could be employed, for example, in accordance with the principles of the invention, to supply instructions to vector tasks. The other bank of memory modules 42 to 44, comprising modules $M'_1$ . . . $M'_L$ could then be employed to supply the data vectors, or vice versa. Each bank of memory modules is provided with its own switch; switch 25 serving $M_1$ . . . $M_K$, while switch 26 operates with $M'_1$ . . . $M'_L$. This organization provides higher performance when data vectors and instructions are stored in different banks of memory modules, since in this case the fetching of instructions and data vectors can be completely overlapped, whereas in an organization such as that that of FIG. 1, the entire memory bank must wait for a single module to supply a vector instruction, before the next data vector can be assessed by all memory modules simultaneously.

Another use of the organization according to FIG. 2 is in having two vector tasks in progress concurrently, with little interference. To this end, the processors engaged in vector task $VT_1$ take their instructions from modules 38 . . . 40 and their data from modules 42 . . . 44, while the processors engaged in the other vector task $VT_2$ take their instructions from modules 42 . . . 44 and their data from modules 38 . . . 40.

Figure 3:
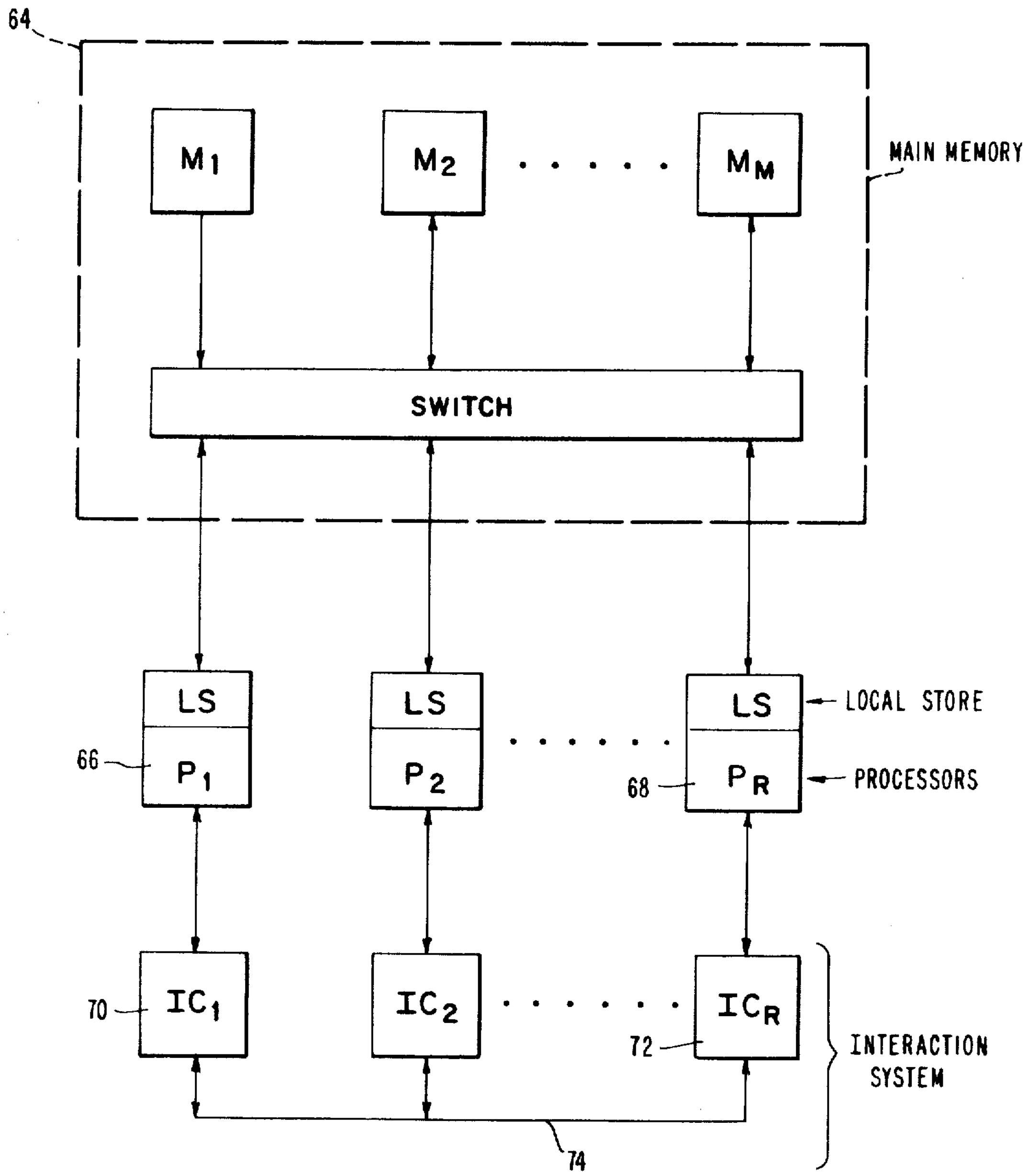
FIG. 3 depicts an embodiment according to the invention wherein vector instructions are loaded from main memory into a local store present in each processor in the system.

FIG. 3 shows another arrangement for carrying out the invention in which the vector task instructions can be loaded from main memory into a local store that is associatetd with each processor 66 to 68 in a set of processors designated $P_1$, $P_2$ . . . $P_R$. The vector program can be initially loaded only into the local store of the originating processor, which would then have to distribute the vector mode instructions one by one to the other participating processors, for instance, by way of the respective interaction controllers 70 to 72, and the common bus 74. Alternatively, the vector program could initially be loaded into the local store of each participating processor thereby making the distribution of vector instructions unnecessary during the execution of the vector program.

The organization of FIG. 3 can also be advantageously employed when the local store is of insufficient capacity to hold the entire vector program. This program, which should be distributed over all storage modules as explained before, is loaded into the local store of all processors participating in a vector task in a manner such that, upon each storage cycle, all processors assimilate one program word, together with its address. During execution, extended control facilities are required in this case for enabling the processor currently distributing instructions from it local store to recognize when its local store does not contain the next instruction to be distributed, to interrogate the other processors in order to find out which of them, if any, has this next instruction within its respective local store to pass the role of instruction distribution to the processor having the next instruction or to initiate new instruction fetches if none of them has it. Such an arrangement has the advantage of optionally utilizing the available memory cycles, at the expense of a considerable amount of control hardware.

For convenience, the principles of operation of the system according to the invention are described in conjunction with the system shown in FIG. 1. Referring to FIG. 1, the process of selecting a subset S of processors that are to participate in a vector task and their synchronization under the control of single instruction stream will now be described. The processors are assumed to be of one of the known types of central processing units, each having one instruction counter and the conventional complement of registers. In addition, the processors comprise certain other registers and circuitry including gates and data paths which are required for the functioning of the system in the vector mode.

Initially, all of the subset S of processors are assumed to be in the normal or multiprocessing mode of operation, i.e., each processor is executing an instruction stream independently of all of the other processors. The transition to the vector mode of operation occurs when one of the processors operating in the normal mode encounters a "Switch-to-Vector Mode" (SVM) instruction. According to one suitable form of the SVM instruction, it supplies two parameters, viz. (1) the number of processors that are to participate in the vector mode of operation and (2) the address of the first instruction of the vector task.

Actually, the number of processors participating in the execution of a task in the vector mode of operation is limited to some number $S_L$ which is equal to or less than the total number of processors. If $S_L$ is chosen to be less than the total number of processors, such situation may indicate that the high priority of other work requires that the non-participating processors continue in their present tasks in the normal multiprocessing mode of operation. Consequently, upon the switching into the vector mode of operation, it first becomes necessary for the operating system to determine the value of S, the number of processors which are to participate in the vector mode of operation, and whether S is equal to or less than the current value of $S_L$. It is to be understood that several variations of the SVM instruction are conceivable, such as the following: (1) When the SVM instruction does not specify a given number of processors, it implies that as many processors will be accepted as are available. (2) A given number of processors may be specified. (3) A number may be specified which represents a lower or an upper limit on the number of processors which are requested and which can be practicably utilized. For the purpose of clarity of description of the invention, it is assumed that the SVM instruction transmits the two parameters S (the number of processors that are to participate) and A (the address of the first instruction of the vector task).

Let it be assumed that a program, running in the normal, i.e., the multiprocessing mode, issues an SVM instruction. This will cause S processors, including the processor issuing the SVM instruction, to operate in the vector mode, i.e., in synchronism until an "end of vector mode" (EVM) instruction is encountered. The processor issuing the SVM instruction, termed the "originating" processor, performs the function of extracting instructions from memory and broadcasting these instructions to the (S 1) other processors participating in the vector mode of operation.

In the vector mode execution of a task, all of the participating processors at every instant execute the same instruction although the sequences of steps performed by the individual processors during the execution of a given instruction need not be identical, nor are these steps generally in synchronism. This is due to the fact that the instruction considered is executed on different data by each processor, as determined for instance by the contents of an index register in each processor. Thus, when a vector mode task is initiated, the corresponding index registers in all of the participating processors have to be initialized so that the set of these processors will, in fact, access the set of properly spaced vector elements when an instruction carries this index address.

In order to facilitate the initialization of the index registers employed in accessing data vectors, the SVM instruction prepares in each of the S processors, a number that will be designated as the "vector index." A set of numbers suitable for initializing the index registers employed in vector accessing contains the numbers zero through (S–1), increasing in steps of unity. The first of these is constructed in the first participating processor, etc. After having been constructed, this vector index may reside, for example, in a special register X belonging to each processor, from where it could subsequently be transferred into any one of the registers belonging to the standard register complement of each processor. Having arrived there, it would be used, either directly or after suitable modification, for instance, by multiplication with the same factor in all participating processors, for initializing the index registers controlling the operands accessed by each processor, thus guaranteeing proper access to vectors of data. The transfer of the vector index can be effected by the program issuing a "vector index to register (XVR)" instruction, for example. Alternatively, one of the registers of the processor can explicitly or implicitly be designated to accept the vector index prepared by the SVM instruction.

The following is a suitable chain of events that will result in the effecting of the function of the SVM instruction as outlined above. Recapitulating in brief, the SVM instruction identifies the set of processors that are to participate in a vector task, causes them to interrupt whatever task they are currently engaged in, switches their control mechanisms to the vector mode (V-flip-flop), constructs a unique vector index X in each one of them, and sets up the proper transfer paths for supplying these slave processors with instructions from the originating processor (O-flip-flop) executing the SVM-instruction.

Upon the recognition of an SVM instruction by an originating processor, the first action is the setting to the "1" state of its O-flip-flop, thereby designating it as the originating processor of the ensuing vector task. Since the originating processor also participates in the vector task, its V-flip-flop is set to the "1" state at this point. In the subsequent identification of the (S–1) other processors to participate in the vector task being initiated, various criteria can be used, the preferred one being that the task currently running on the processors to be interrupted be of the lowest relative priority. In addition to task priority, it will usually be desirable to provide facilities for excluding, or locking out, certain processors from being considered as possible participants in a vector task, because, for instance, a given processor is operationally disabled, or because it is executing a privileged task that must be protected from interruption. Such a lock-out facility could be based on a special flip-flop L provided in each processor and set to the "1" state by the supervisor, if the processor is to be prevented from participating in a vector task.

The process by which the originating processor acquires control over the (S–1) other processors to participate in a vector task may assume various forms. For example, it may proceed entirely under control of the originating processor, or it may be partitioned into S distinct phases, such that each phase is controlled by the processor last acquired in effecting the acquisition of one additional processor whereupon this processor passes control to the processor just acquired, and so forth until all (S–1) processors have been acquired.

In the first embodiment to be described, it is assumed the latter procedure is used, but alternative acquisition procedures specifically suited to the particular processor-to-processor communication facilities provided in the system will readily come to mind. For instance, the second embodiment, based on distributed and functionally specialized processor interconnections for control purposes, concentrates all of the acquisition process in the originating processor.

Thus, in the particular acquisition procedure adopted for the purposes of the first illustration, the last-acquired processor will identify the curently lowest priority processor that is not locked out from participating in a vector task (L-flip-flop set in "0" state) and that is not already engaged in a vector task (V-flip-flop set in "0" state), and cause it to set its V-flip-flop to the "1" state. Then this newly identified processor is made to interrupt its task, which involves the storing of the task state in memory as well as appropriate modifications in the system task queue. Subsequently, control over the acquisition process is passed on to the newly acquired processor, and completion of the current phase of the acquisition process is signalled to the originating processor.

As has been stated, the processor-to-processor communication required for bringing about the above-mentioned events can be effected by the use of interaction controllers which are respectively associated with each of the processors and which are all connected to a common bus. Alternatively, a stored program or a microprogram could cause the processors to communicate through memory. In either case, the selection process of the respective (S–1) participating processors must be accomplished sequentially, i.e., one processor at a time, since it involves a count-down procedure. The count-down can be exploited in constructing the vector index X, which thus becomes a fallout of the acquisition of the proper number (S–1) of participating processors.

Explaining this acquisition process in more detail, it begins with the originating processor, which decrements the quantity S contained in its instruction register by unity and stores the result in its own X register. Then it determines which of the processors, whose L-flip-flops are not set, is currently engaged in the lowest priority task and causes that processor to sets its V latch and to dump the task it is curently executing, which involves task interruption and task state storage.

In this connection, it may be that more than one processor is found to have equally lowest priority. In such a case, a tie-breaking procedure is required. An example of such a procedure is disclosed in the aforementioned Pat. No. 3,445,822 of Graham C. Driscoll for "Communication Arrangement in Data Processing System," Ser. No. 653,535, issued May 20, 1969. The tie-breaking procedure ensures that only one processor responds as having the currently lowest priority.

After this lowest priority processor has been identified, the quantity stored in the X register of the originating processor is transmitted to the responding processor and, at this juncture, the process of acquiring additional processors for participating in the vector mode operation is taken over by the responding processor. After taking over, this processor decrements by unity the vector index transmitted to it, it stores the decremented index in its own X register, and it initiates the interruption of the task it is currently executing. As is well-known, task interruption entails the storing of the task state in memory and appropriate modification of the system task queue. The actions which ensue upon the take-over are preferably controlled autonomously and once they have been initiated, the processor taking over can immediately proceed to determine its successor in the acquisition sequence, the determination procedure being identical with the procedure performed by its predecessor.

The foregoing process continues until the last processor acquired as a participating processor recognizes that it has decremented its vector index to the value zero, whereupon the acquisition process stops. This fact indicates that precisely S processors, including the originating processor, have been identified as participants in the vector task, so that the last-aquired processor must refrain from acquiring an additional processor.

The process of acquisition together with the (S–1) task interruption processes may collectively form a single sequential process, or the individual interruption processes may be made to take place in part concurrently with each other and with the acquisition process.

During the acquisition, the originating processor may sit and wait for the completion of the processor acquisition process, before proceeding to fetch and distribute vector instructions. Alternately, this processor may be provided with an instruction buffer which would enable it to prefetch the vector mode instruction sequence, i.e., to load its instruction buffer immediately after having passed control over the acquisition process to its successor.

According to the invention, provision is made for the originating processor to recognize when all (S–1) acquired processors have completed the interruption of their current task, whereupon it will initiate the distribution of vector instructions. This recognition mechanism, according to the invention, can suitably make use of the arrangement that is provided for synchronizing the execution phase of all instructions during vector mode processing. The latter arrangement comprises two flip-flops, provided in each processor and designated I and E, whose states indicate the activity status of the instruction fetch and instruction execution mechanisms respectively of the associated processor. In addition, provisions are made for signalling the state of the E flip-flops of all participating processors to the originating processor. The task interruption process is treated by each processor as if it were the normal execution of a vector mode instruction during which the E flip-flop of this processor is in its "1" state ("E-cycle"). Thus, the resetting of all (S–1) E flip-flops to their "0" states serves to inform the originating processor of the completion of all task interruptions when an SVM instruction is being executed, as well as of the completion of the execution of other vector mode instructions.

In considering how, according to the invention, instructions are fetched by the originating processor, it is first to be realized that only one instruction stream is required to control all of the processors in the vector mode of operation. This generally results in a drastic reduction of storage interference. To effect this economy of storage accesses, the instruction fetch mechanisms in all participating processors except the originating processor are disabled. Since the originating processor, thus, is the only one which can fetch instructions from memory, it has the responsibility of distributing or broadcasting the fetched instructions to the (S–1) other processors whose V flip-flops are in the "1" state. This is accomplished by causing the normal instruction fetch mechanism to be disabled in every processor whose V flip-flop is set in the "1" state, and whose O flip-flop is reset in the "0" state, and by providing means for transmitting instructions fetched by the processor whose V- and O-flip-flops are set in the "1" state to the instruction register of all processors whose V-flip-flop is set and whose O-flip-flop is reset.

The data communication paths over which the fetching and broadcasting of instructions, as well as the fetching and broadcasting of data words are effected, can be provided in several different arrangements, which differ in the quantity of hardware they require and in the degree of concurrency or overlap they render possible. The following are examples of fetching and broadcasting arrangements.

(1) A special bus interconnecting the processors is used by the originating processor for broadcasting vector instructions and operands that are required by all participating processors in common, whereas a conventional switching network effects all fetching and storing by the processors from and to memory.

(2) Separate broadcast busses for instructions and for common operands, respectively, permitting concurrent transmission of instructions and operands. This arrangement is advantageous if separate sources for instructions and operands are provided, such as one memory for instructions and another memory for operands.

(3) A modification of the circuitry controlling a standard memory-to-processor switching network, whereby an originating processor can induce the network to present to all processors a word read from memory on behalf of the originating processor, rather than to the requesting processor alone.

A particular embodiment of the first broadcasting arrangement mentioned above is illustrated in FIG. 4. It comprises a conventional memory bank connected to a switching network, collectively represented as a block 400, a number of processors of identical structure and connected to the switch, of which two are represented by blocks 401 and 402, and a broadcast bus 405 with two broadcast control lines 406 and 407, which serve to interconnect the storage registers 410 of appropriate processors.

Within each processor, the storage register 410 is shown through which all traffic of instructions and operands to and from a given processor is routed, and as much of the control circuitry as is relevant to the control of this traffic. Apart from this, the organization of the processor registers, transfer paths and controls may follow conventional practice.

Figure 4:
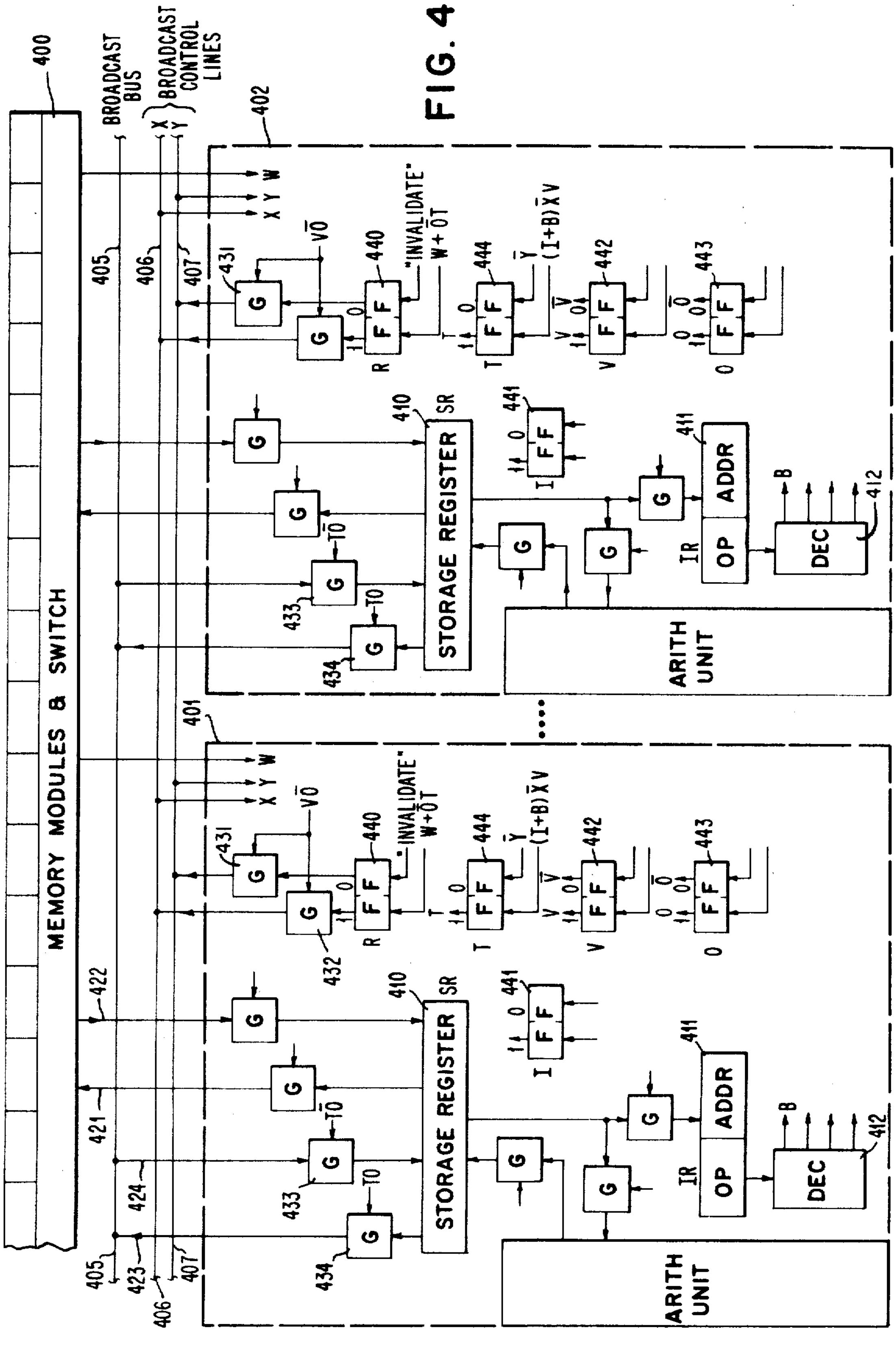
FIG. 4 is a depiction of one embodiment suitable for use as a broadcasting arrangement in accordance with the invention.

More specifically, the bussing arrangement shown in FIG. 4 comprises a path 421 from and a path 422 to the storage register 410 of each processor, connecting it through the switch to the memory modules. Since the structures of these paths are conventional their gates and controls are not shown explicitly. In addition, there is a path 423 from and a path 424 to the storage register connecting it with the broadcast bus 405. Paths 423 and 424 are used in the vector mode, and transfers over these paths are controlled by gates 434 and 433, respectively.

In order to avoid cluttering up of the drawings, the convention is adopted of representing the gating circuits by their equivalent Boolean expressions. The variables in these expressions represent the states of the flip-flops in the processors considered that have the same designation. Thus, gate 433 is open whenever flip-flop T (444) is in the "1" state and flip-flop O (443) is in the "0" state, as denoted by the expression $T\overline{O}$ which appears as the controlling input to gate 433.

In broadcasting a word from the storage register 410 of the originating processor, that is, the one having its O flip-flop 443 in the "0" state, to the storage register 410 of all of the other processors participating in the vector mode, i.e., those that have their V flip-flop 442 in the "1" state and their O flip-flop 443 in the "0" state, gate 434 of the originating processor and gate 433 of all participating processors must be open concurrently. This synchronizing action is effected by means of the broadcast control lines 406 and 407, as follows.

In the present embodiment, the control lines 406 and 407 each operate essentially like a distributed DOT–OR circuit, whose inputs represent the validity R and the non-validity $\overline{R}$ of the contents of the storage register SR, respectively, of the participating processors, exclusive of the originating one. This validity state is contained in flip-flop R (440); in other words, its "1" output is gated through a gate 432 to line 406, and its "0" output is gated through a gate 431 to line 407. The OR'ed R and $\overline{R}$ signals, denoted as X and Y respectively, can be sensed by all processors by means of extensions of the control lines 406 and 407, respectively. It is evident that $X=0$ only when all participating processors ($V=1$, $O=0$) have invalid SR contents, i.e., $R=0$, while $Y=0$ only when all these processors have valid SR contents ($R=1$).

To effect the broadcasting of the contents of the SR register 410 in the originating processor ($O=1$) to the SR registers of all other participating processors ($V=1$), gate 434 in the originating processor must be opened concurrently with the opening of gate 433 in all participating processors, but not in the originating one. This synchronous gating operation is effected by means of the T flip-flop 444 in each processor, all of which operate in unison, under control of the signals X and Y described previously. This is defined by the gating function $T\overline{O}$ of gate 433 and the gating function TO of gate 434. The setting of the T flip-flops occurs either during the instruction-fetch phase ($I=1$), when the instruction supplied by storage must be broadcast, or during execution of those instructions that require all participating processors to receive copies of the same operand; in the latter case, upon the decoding of the OP code of the instruction currently residing in the instruction registers IR (411) of all participating processors, the output legended "B" of decoder 412 will yield a "1" signal. If either of these conditions prevails ($I+B$), and if all participating processors (exclusive of the originating one) have invalid SR registers ($\overline{X}=1$), the T flip-flops of the vectoring processors ($V=1$) will be set into the "1" state; the function of the switching circuit performing this action is defined more concisely by the Boolean expression "$(I+B)\overline{X}V$."

Thus, the T flip-flops will open appropriate gates effecting the broadcast as soon as these conditions are met; the gates remain open until all participating processors have indicated that they have received the broadcast, i.e., that their SR registers are now valid. At this point, all R flip-flops 440 are in the "1" state, the Y signal on line 407 disappears and this fact resets all T flip-flops ($\overline{Y}=1$), thereby closing the broadcast gates.

Turning now to the circuits controlling the R flip-flops 440, it is noted that as soon as the contents of the SR register have been used (either by broadcasting an instruction and/or transferring it from SR to the instruction register 411, or by transferring an operand from SR to the aithmetic unit, or by transferring an operand to be stored from SR to the memory), the R flip-flop associated with that SR register is reset into the "0" state. These actions are entirely internal to the individual processor and conform to standard practice; hence, the circuits involved are not described in more detail.

The setting of R into the "1" state, on the other hand, occurs when the SR register has received a new contents, either from memory, or from the broadcast bus. The former case is indicated by the memory supplying a completion signal W to the processor to whom it is gating a word. The latter case occurs upon the setting of the T flip-flop of a non-originating processor into the "1" state, indicating that a broadcast is now taking place ($\overline{O}T$). These conditions are concisely expressed by the Boolean expression "$W+\overline{O}T$."

As a part of the vectoring controls shown in FIG. 4, each processor comprises provisions appropriate for entering the vector mode, which are not shown in FIG. 4, but an example of which will be detailed further hereinbelow. Principles similar to those demonstrated in FIG. 4, which describes the vectoring controls of a configuration like that shown in FIG. 1, can be applied by those skilled in the art to embody the vectoring controls implied by the configurations shown in FIGS. 2 and 3, as well as of still different configurations that operate within the spirit of the invention.

As to the second fetching and broadcasting arrangement set forth hereinabove, reference is made to FIG. 5, which shows the data paths and control lines required for time-overlapped broadcasting of instructions and operands. This arrangement is advantageous in case instructions and data vectors are stored in disjoint memory modules.

Figure 5:
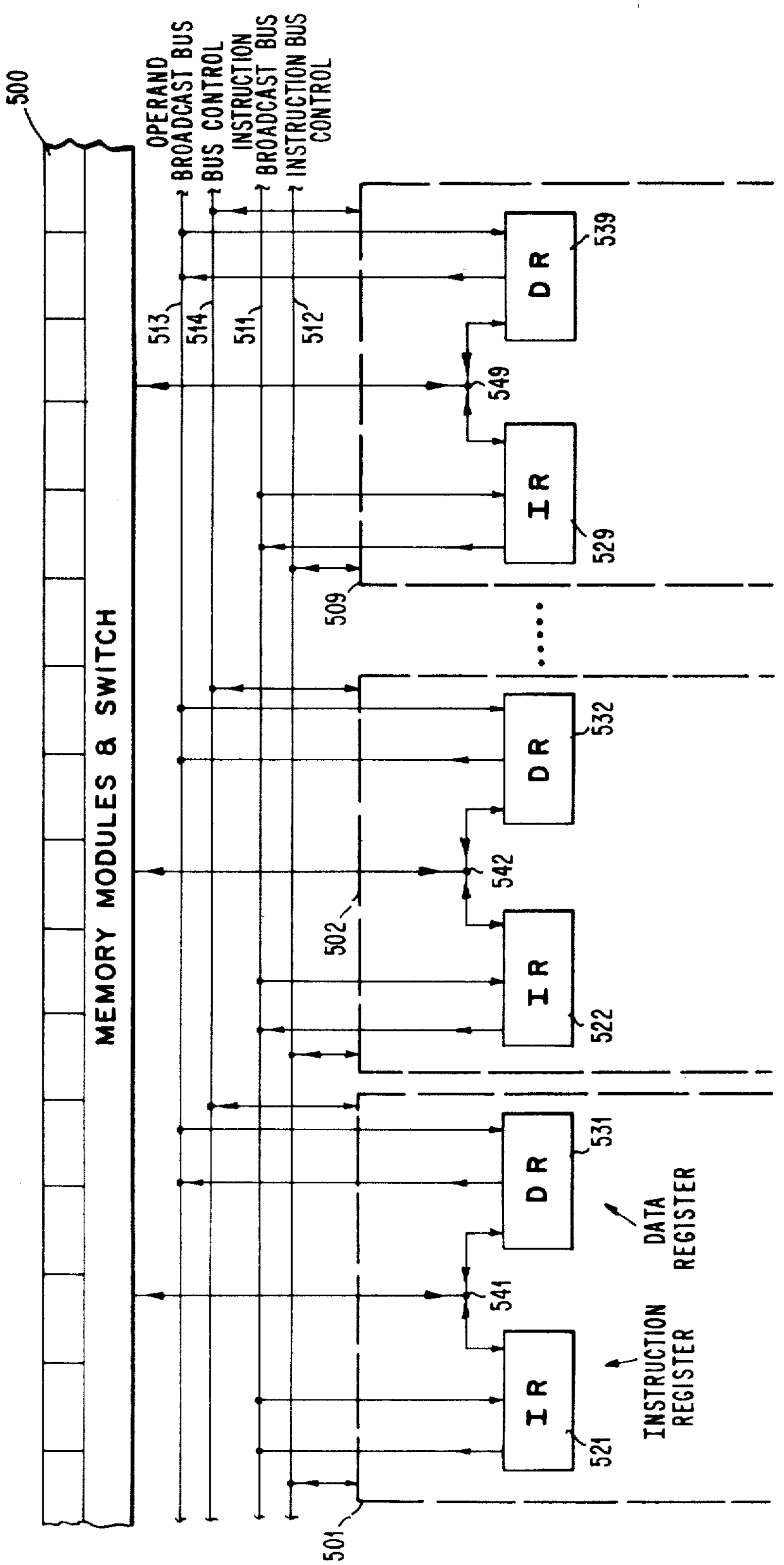
FIG. 5 is a diagram of another embodiment suitable for use as a broadcasting arrangement in accordance with the invention.

FIG. 5 shows a memory bank and switch combination 500, processors 501, 502 . . . 509, an instruction broadcast bus 511 with its control line(s) 512, and an operand broadcast bus 513 with its control line(s) 514. To achieve concurrency, the memory switch is connected to both the instruction registers 521, 522 . . . 529 and the data registers 531, 532 . . . 539 of each processor, by means of paths 541, 542 . . . 549, respectively. Further, all instruction registers are connected to the instruction bus 511 and all data registers are connected to the operand bus 513 via the paths shown.

In operation, this arrangement may rely on the same synchronization scheme as illustrated in FIG. 4 in connection with the SR register depicted there, which would be applied in two independent copies to control the organization of FIG. 5, one copy using a control line pair 512 for controlling the broadcasting of instructions via bus 511, the second copy using a control line pair 514 for controlling the broadcasting of operands via bus 513. The organization and control of each processor follows well-known principles applicable to machines capable of overlapped instruction fetch and execution cycles; consequently, the detail of the internal processor structure will be evident to those skilled in the art.

Figure 6:
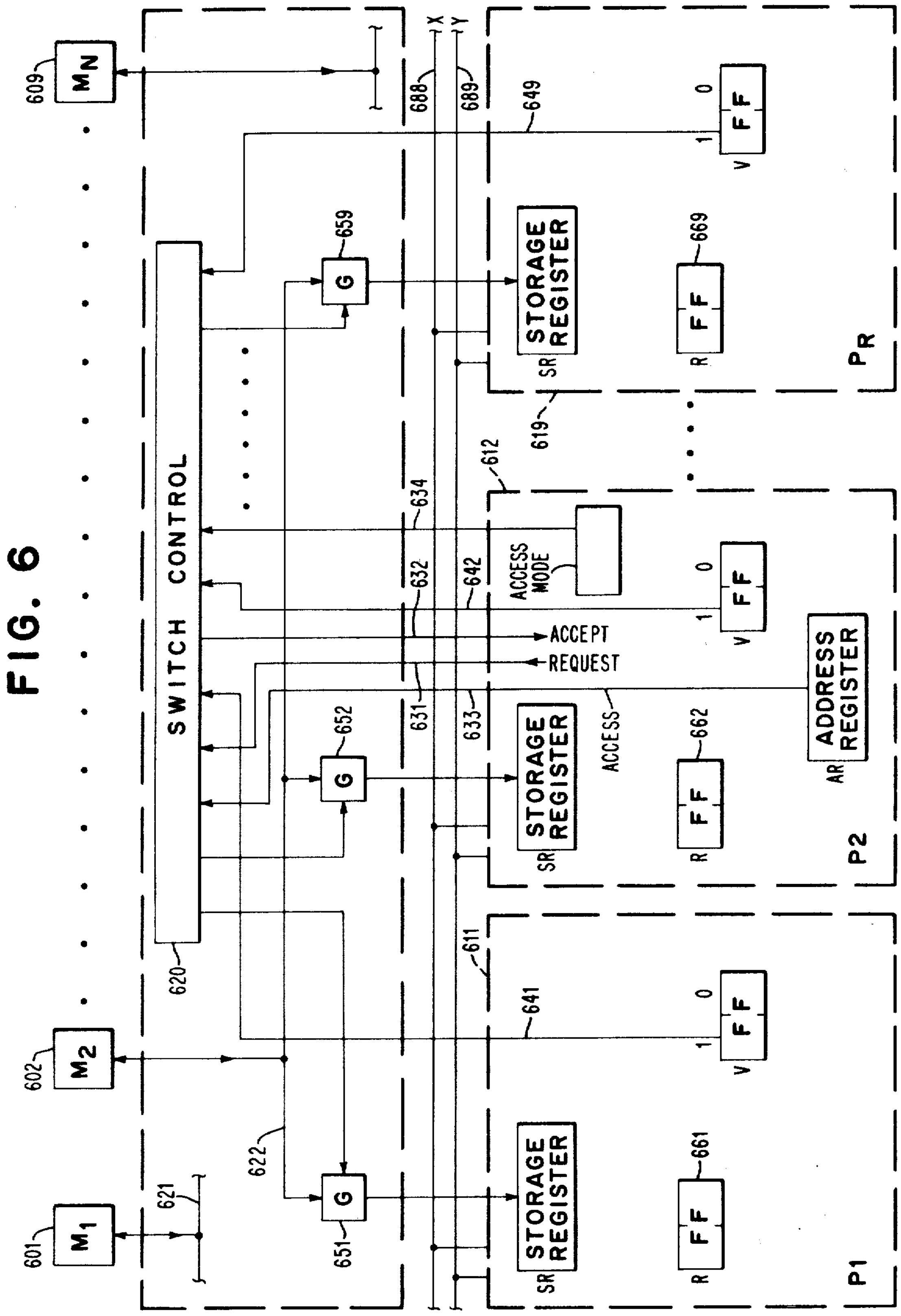
FIG. 6 shows a crossbar switching arrangement suitable for use according to the invention.

The third fetching and broadcasting arrangement mentioned earlier contents itself with the address and information paths comprised by a standard crossbar switch, or its equivalent, for connecting memory modules and processors in both the multiprocessing and the vector modes. It is illustrated in FIG. 6, which shows N memory modules $M_1$, $M_2$ . . . $M_N$, R processors $P_1$, $P_2$ . . . $P_R$, and a switch interconnecting these. For expository purposes, only the paths from memory module $M_2$ to all processors are shown explicitly.

In this arrangement, the processor notifies switch control SC with each access request of the type of distribution as well as of the type of access desired, and each processor keeps the SC current as to whether or not it participates in a vector task (V state). This information enables the SC to route words that must be broadcast concurrently to all processors concerned, thereby obviating the need for a special broadcast bus, as well as the time taken for transfers from the originating to the participating processors over this bus.

In the embodiment of the third bussing arrangement shown in FIG. 6, a processor 612 in order to obtain a memory access raises its request line 631 that extends to SC 620, simultaneously presenting the address of the location to be accessed via path 633 and the mode of access by path 634. If the SC discovers that the module addressed is available, SC accepts the address and the mode indicator, notifying $P_2$ of its acceptance via line 632. Furthermore, all participating processors, i.e., those having a V flip-flop in the "1" state, convey this fact to the SC on a continuous basis by lines 641, 642 . . . 649. The access mode indicated may be any one of the following: a simple fetch, a simple store or a broadcast fetch. This range of modes is appropriate to a processor organization in which all communication over the busses is routed through a single register SR; other organizations may require a different range of modes.

Assuming now a simple fetch from module $M_2$ is requested by $P_2$, the switch control will open gate 652 at the time $M_2$ presents the word requested, exactly as in a conventional multiprocessing system. If, however, the fetch request emitted by $P_2$ was in the broadcast mode, SC will not only open gate 652 upon arrival of the word requested, but all those of the gates 651, 652 . . . 659, whose associated V lines 641, 642 . . . 649 convey the V state "1." This requires, of course, that all V processors are ready to accept this word when it arrives; to insure readiness, a synchronization means must be provided. In FIG. 6, it is assumed that a synchronizing scheme similar to that described in connection with FIG. 4 is employed, represented by the X and Y lines 688 and 689, respectively, which are driven and used in exactly the same way as in FIG. 4, based on R flip-flops 661, 662 . . . 669.

It will be evident to those skilled in the art that the paths and gates provided for and the synchronization of the instruction and operand traffic in the vector mode can be achieved by means other than that here described in detail by way of example.

In the portion of the description of the invention which follows hereinbelow and in the remaining figures, there are described and shown an illustrative embodiment of the arrangement of necessary hardware in a processor of a multiprocessing system, constructed in accordance with the principles of the invention, for enabling normal and vector mode operations and the facile switching between these modes.

Figure 7:
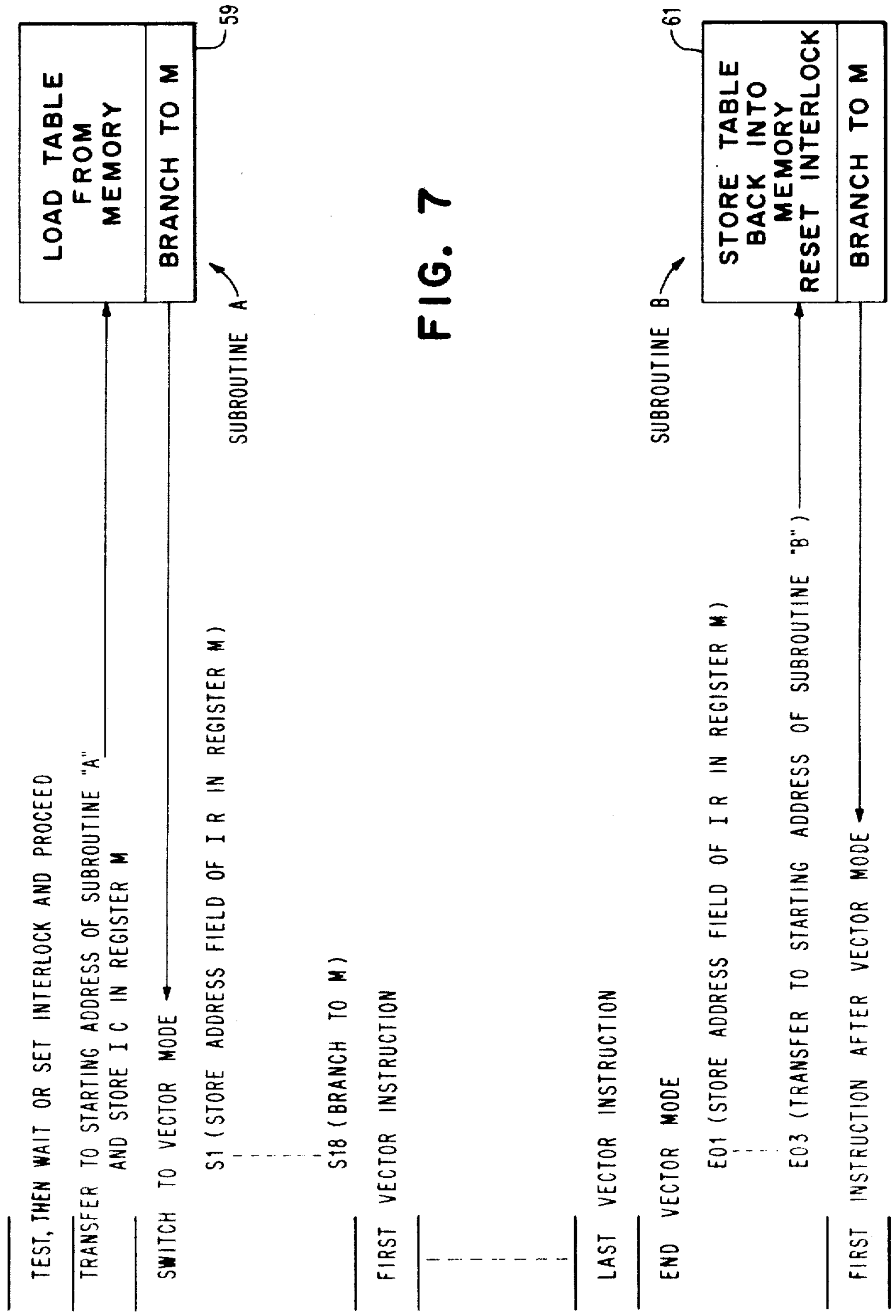
FIG. 7 essentially shows a flow diagram, according to the invention, of the processes which are undergone in the switching from the normal to the vector and from the vector to the normal modes of operation.

In this connection, reference is first made to FIG. 7, wherein there is shown a sequence of activities which are undergone in the carrying out of the transfer from the normal to vector mode of operation and the return to the normal mode when the vector mode is completed. As seen in this sequence, the first activity, i.e., test, then wait or set interlock and proceed, comprises a machine instruction, viz, a "test for zero and wait (TZW)." This instruction is described in copending application of Meir M. Lehman, Jack L. Rosenfeld and Hans P. Schlaeppi for "Interlock Arrangement," Ser. No. 742,676, assigned to the present assignee. Briefly described, the TZW instruction encompasses the following elements:

(1) A specified location in memory accessible to a plurality of processors which location contains interlock information.

(2) A special memory cycle in which such an interlock location is both tested and then modified depending on the outcome of the test without interference possibility by concurrent memory accesses originated from other processors.

(3) A "wait" state in which a processor preserves the state of a task without executing any instructions, i.e., without consuming memory cycles, and into which it automatically enters into upon testing an interlock which it finds locked.

(4) Communication provisions available to each processor by which a processor can cause some or all of the waiting processors to resume operation, i.e., leave their respective "wait" states.

In the operation of the TZW instruction, the shared memory has a specified location for containing the chosen configuration of bits which indicates that a given entity is already in use by one of the processors and another chosen configuration of bits for indicating that the given entity is available for use by processors seeking to use it. Each of the processors comprises means responsive to the encountering of the TZW instruction for determining which of the chosen configurations is present in the specified location of the shared memory and means responsive to the determination that the first configuration is present for causing a processor attempting to use the given entity to be placed in a wait state relative to the entity. If, upon the encountering of the TZW instruction, a processor attempting to use a given entity determines that the second configuration is present in the specified location in memory, it causes the first configuration to be placed in such specified location to thereby lock out all of the other processors from using the entity, whereupon this processor is free to proceed in executing its program.

The next activity shown in FIG. 7 is the carrying out of the machine instruction entitled "transfer to starting address of 'subroutine A' and store the contents of the instruction counter (I.C.) in register M." This instruction is a well-known instruction and is used in many of the presently known computer systems. When the contents of the instruction counter are placed in register M, they are incremented by one. Subroutine A is conceptually depicted in block 59. In subroutine A, an availability and priority table contained in memory is loaded into the appropriate registers in the originating processor. This program makes use of special instructions for all intents and purposes identical to "load register" type instructions that are well-known in the art (e.g., CLA for IBM 7090). The only difference is that the destination registers for the special instructions are the "availability and priority registers" of FIG. 8. It is to be noted in block 59 that the last instruction in subroutine A is a "branch to M." From this, it is readily understood that, at the end of subroutine. A, a branch is made back to the next instruction in the sequence, following the "transfer to starting address of 'subroutine A' " instruction, which is the "switch to vector mode" instruction.

The "switch to vector mode" instruction is shown as embodying the steps S1 (store address field of instruction register (IR) in register M) through S18 (branch to M). As will be further explained hereinbelow, steps S1–S18 represent the steps controlled by the outputs of respectively actuated monostable multivibrators which are utilized to carry through a microprogram which effects the switching in the multiprocessing system from the normal mode to the vector mode of operation.

The next activity detailed in FIG. 7 is the carrying through of the vector mode operation and is shown in this figure as encompassing the first to last vector instructions. Upon the completion of the execution of the last vector instruction, the end vector mode sequence is entered into. This sequence is implemented by the EO clock which comprises monostable multivibrators EO1–EO3, monostable multivibrator EO1 effecting the step of storing the address field of the instruction register in register M and monostable multivibrator EO3 effecting the step of the transfer to the starting address of subroutine B.

Subroutine "B" is conceptually depicted in block 61 in FIG. 7. As seen therein, this subroutine comprises the storing of the availability and priority table from the registers in the originating processor back into memory and the resetting of the interlock. This resetting is effected by the machine instruction "reset interlock." This instruction is described in copending application of Meir M. Lehman, Jack L. Rosenfeld and Hans P. Schlaeppi for "Interlock Arrangement," Ser. No. 742,676, assigned to the present assignee. It operates in cooperation with the TZW instruction described hereinabove and utilizes the two chosen configurations of bits at the specified memory location.

Relative to the reset interlock (RI) instruction, each of the processors includes means responsive to the encountering of the RI instruction to cause the second configuration to be stored in the specified location in shared memory and means responsive to such storing for broadcasting a signal to the other processors that the entity is now available for use, the broadcast signal being operative to terminate the wait state in all processors that have been waiting for the entity to become available for use.

The branch to M step is again undergone at the end of the subroutine "B" to the next instruction, such next instruction being the first normal mode instruction in the program which was being executed by the originating processor when it was interrupted by the switch to vector mode (SVM) instruction.

The embodiment of the availability and priority table according to the invention is depicted in FIGS. 8 and 8A–8H. As has been mentioned hereinabove relative to subroutines A and B, this table, which is loaded from and stored back into memory in these routines, respectively, is required in the execution of the SVM instruction. Accordingly, for convenience of explanation, the organization of this table is first described.

Referring now to FIGS. 8 and 8A–8H, there is provided therein a row of flip-flops, viz flip-flops 100A, 106A, 108A, 110, 112A and 114A. Flip-flop 100A is the topmost flip-flop of a column of flip-flops 100A–100P. Similarly, the other flip-flops of the topmost row of flip-flops are the topmost flip-flops respectively of columns bearing their same numerals but having the progressively ascending letter designation. Thus, in the second column from the left headed by flip-flop 106A, there are included flip-flops 106A–106P, etc. In the rectangular array of flip-flops depicted in FIGS. 8 and 8A–8H, the four rightmost flip-flops in each row are employed to store the identification number of a processor in the multiprocessing system. As an example, in the A, i.e., the topmost row, such storing is effected in flip-flops 108A, 110A, 112A and 114A.

In the determining of the participating processors, each processor has a priority associated therewith. The letter designation of the row in which the identification number of the processor is stored indicates the degree of priority of such processor. For example, if the four rightmost flip-flops of the A row are selected to contain the identification number of the processor with the lowest priority, then the four rightmost flip-flops of the P row will contain the identification number of the highest priority processor, the degree of priority progressively increasing between the A row and the P row.

The second leftmost flip-flop column contains a flip-flop for each row which indicates whether or not the processor whose identification number is contained in the four rightmost flip-flops of that row is or is not available for vector mode operation. Thus, for example, if flip-flop 106P is in its "0" state, then the processor whose identification number is stored in the four rightmost flip-flops of the P row is not available for vector mode operation. The flip-flops in the leftmost column, viz flip-flops 100A–100P respectively, are employed to respectively remove originating processors from the status of candidates as slaves for other originating processors. Thus, for example, if a processor represented by the A row is the originating processor, then flip-flop 100A is in its "1" state during such situation and such processor is removed from being eligible as a slave for another originating processor.

For convenience of description and explanation of operation, the table shown in FIGS. 8 and 8A–8H is one designed for a system comprising sixteen processors. It is, of course, realized that this is merely by way of example and that in accordance with the invention, a great many more processors can be included in the total multiprocessing system and also be eligible for the vector mode operation.

Reference is now made to FIGS. 9 and 9A–9M, in conjunction with FIGS. 8 and 8A–8H, for a description of the illustrative embodiment. It is, of course, realized that the system shown in these figures is provided in all of the processors in a multiprocessing system which are to be capable of operating both in the normal and vector modes of operation and enables each of the processors to be an originating processor when a vector mode of operation is called for.

In the system, there is provided an instruction register (IR) 63 (FIG. 9E) which has four fields. The leftmost of these fields contains the operation code (OP). The next field, legended "P," contains the number of processors that are to participate in a vectoring operation when a "switch to vector mode" instruction is encountered. The address field contains the address of the first vector mode instruction, and the rightmost field comprises a validity bit which indicates whether or not the instruction is valid. Relative to such validity, for example, at the start of an execution cycle, this validity bit is set to "0". When a new instruction is fetched, one of the leads in a cable 148 is connected through a gate 150 to the set input of this validity bit flip-flop to switch this flip-flop to its "1" state every time a new instruction is fetched and loaded into instruction register (IR) 63.

A gate 134 (FIG. 9F) is provided in order to gate the operation code from instruction register 63 to the execution mechanism, the latter term intending to signify a conventional instruction execution arrangement which is present in any known processor. In other words, all instructions other than those of the "switch to vector mode" and "end vector mode" types would be handled by the normal execution mechanism.

When a processor begins its execution cycle, there is produced a pulse on a line 140 (FIG. 9E) which passes through an OR circuit 142 and is employed to reset the rightmost flip-flop, i.e., the validity bit flip-flop of instruction register 63 to the "0" state. At this juncture, it is indicated that the instruction has been executed and is no longer valid.

In the event that the processor is a non-vector mode operating or an originating processor, the pulse on line 140 will enable an AND circuit 130 since an OR circuit 65 would be enabled by the input thereto of the non-vector signal or the originating processor signal, the output of AND gate 130 appearing on a line 146 being utilized to advance the instruction counter and fetch the next instruction in the normal mode of operation. This next instruction, when it would be provided by the instruction fetch mechanism, would appear on cable 148, pass through gate 150 (FIG. 9E) and be loaded into instruction register 63. It is noted that gate 150 is enabled both in the operation of a non-vector mode operating processor or in the operation of an originating processor. The pulse on line 140 is also operative to set a flip-flop 67, i.e., the "E" flip-flop, to its "1" state.

Figures 9, 9A, 9B, 9C, 9D:
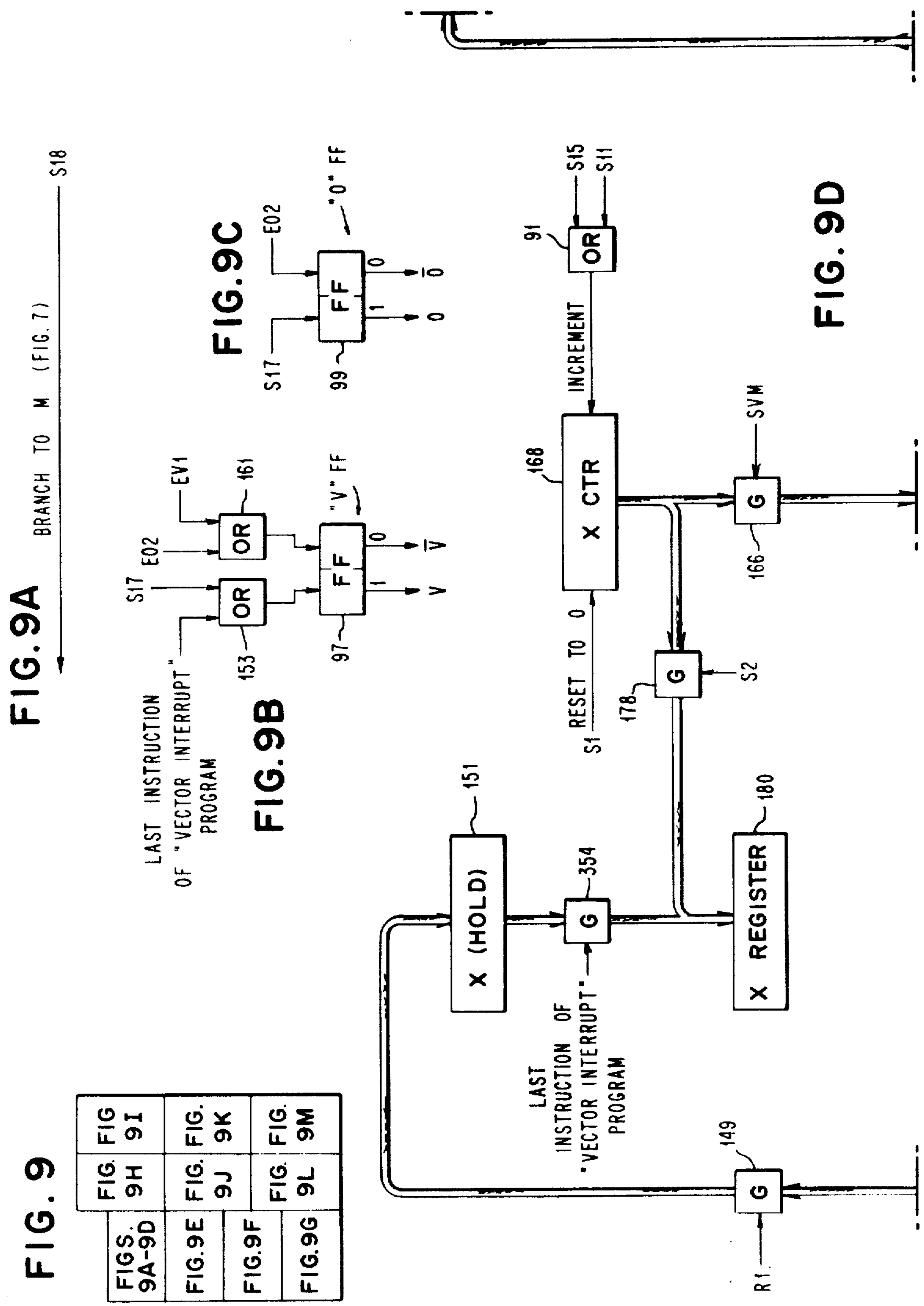
FIG. 9A shows the "Branch to M" step as set forth in FIG. 7.
FIG. 9B illustrates the operation of the "V" (vector mode) flip-flop.
FIG. 9C shows the operation of the "O" (originating processor) flip-flop.
FIGS. 9D–9M, taken together as shown in the pertinent portion of FIG. 9, is a depiction of an illustrative embodiment of an arrangement present in a processor, according to the invention.
Figure 9E:
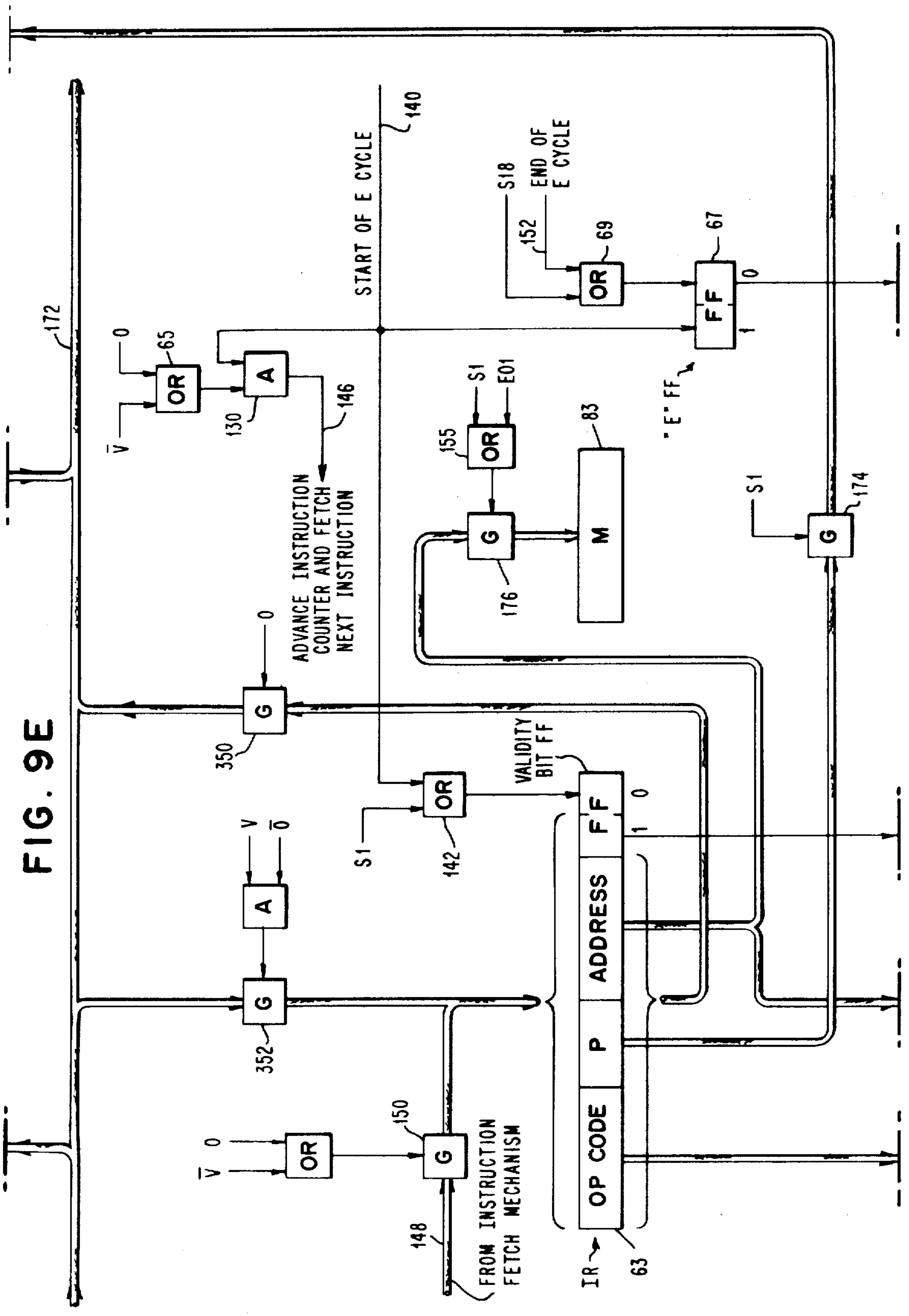
Figure 9F:
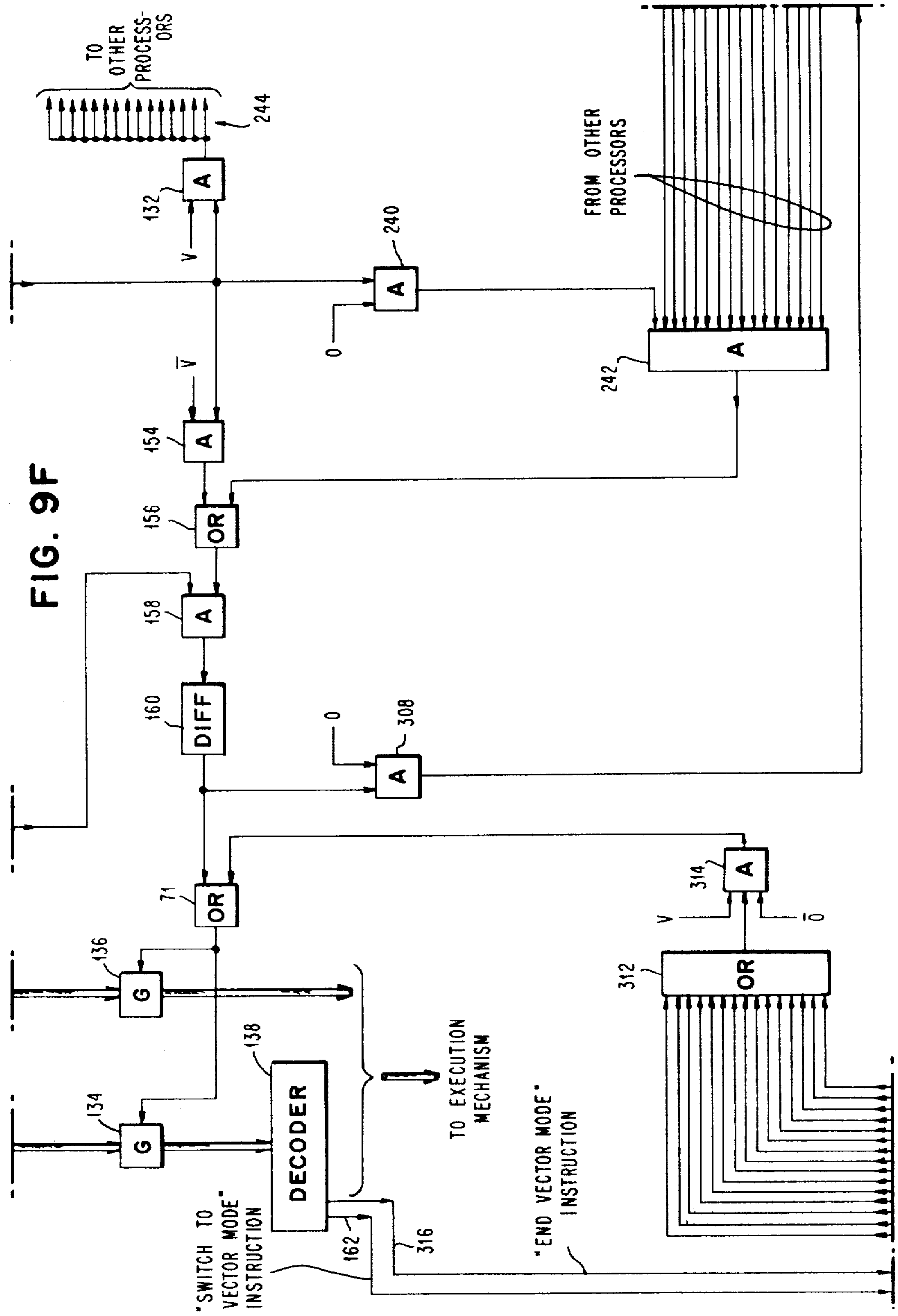

At the end of an execution cycle, there would normally be applied a pulse on a line 152 which would pass through an OR circuit 69 (FIG. 9E) to reset flip-flop 67 to its "0" state. Flip-flop 67 remains in its "0" state in a non-vector mode operating processor. The reset output of flip-flop 67 enables an AND circuit 154 (AND circuit also requiring the $\overline{V}$ signal, i.e., the non-vector mode input) thereby providing an output from an OR circuit 156 (FIG. 9F). The output of OR circuit 156 is applied as one input to an AND circuit 158, the other enabling input to AND circuit 158 being the "1" state of the output of the validity bit flip-flop in instruction register 63. The output of AND circuit 158 is applied to a differentiating circuit 160, differentiating circuit 160 functioning to produce a pulse at its output which is applied through an OR circuit 71 to a pair of gates 134 and 136. Gate 134 is operative to gate the operation code to decoder 138 and gate 136 functions to gate the address field of instruction register 63 to the execution mechanism.

At this juncture, consider the steps that take place when the decoding of a "switch to vector mode" instruction is proceeding. It is to be noted that in this situation, the output of decoder 138 does not go to the execution mechanism but appears on a line 162 (FIG. 9F). The signal appearing on line 162 is applied to the first stage 164 in the S clock (FIG. 9G) which controls the microprogram for effecting the switch to vector mode operation.

The microprogram clock as utilized in this embodiment comprises a series of monostable multivibrators which effect a microprogram step during their pulse output or quasi-stable periods. The monostable multivibrators are arranged such that they are triggered to their output states either by a pulse applied on a line leading thereto from another portion of the embodiment or by the transition from the quasi-stable to the stable state of one of the other monostable multivibrators in the clock, generally the immediately preceding one.

Thus, it is seen how the decoding of the SVM instruction initiates the operation of the S clock. In addition, the resultant output on line 162 is also applied to a flip-flop 73 (FIG. 9G), i.e., the "SVM" flip-flop, to set it to its "1" state, the latter setting enabling a gate 166 (FIG. 9D) which connects an X counter 168 to a bus 172 which extends to all of the other processors. The switching of flip-flop 73 to its "1" state also effects the disabling of a gate 170 (FIG. 9M), the reset output of flip-flop 73 being applied to the latter gate.

Figures 8, 8A:
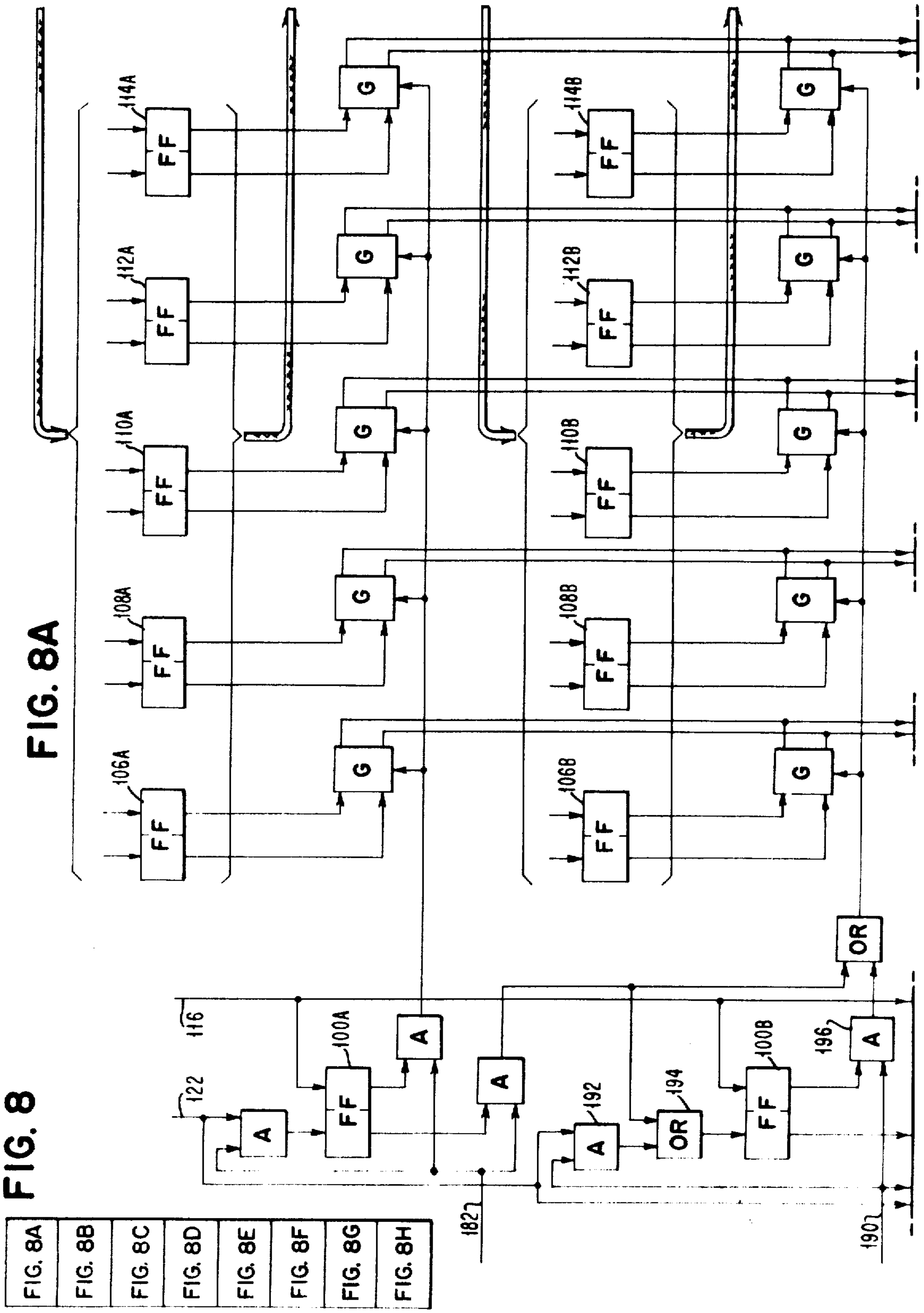
FIGS. 8A–8H, taken together as in FIG. 8, constitute a depiction of an embodiment suitable for use as an availability and priority table in carrying out the invention.
Figure 8B:
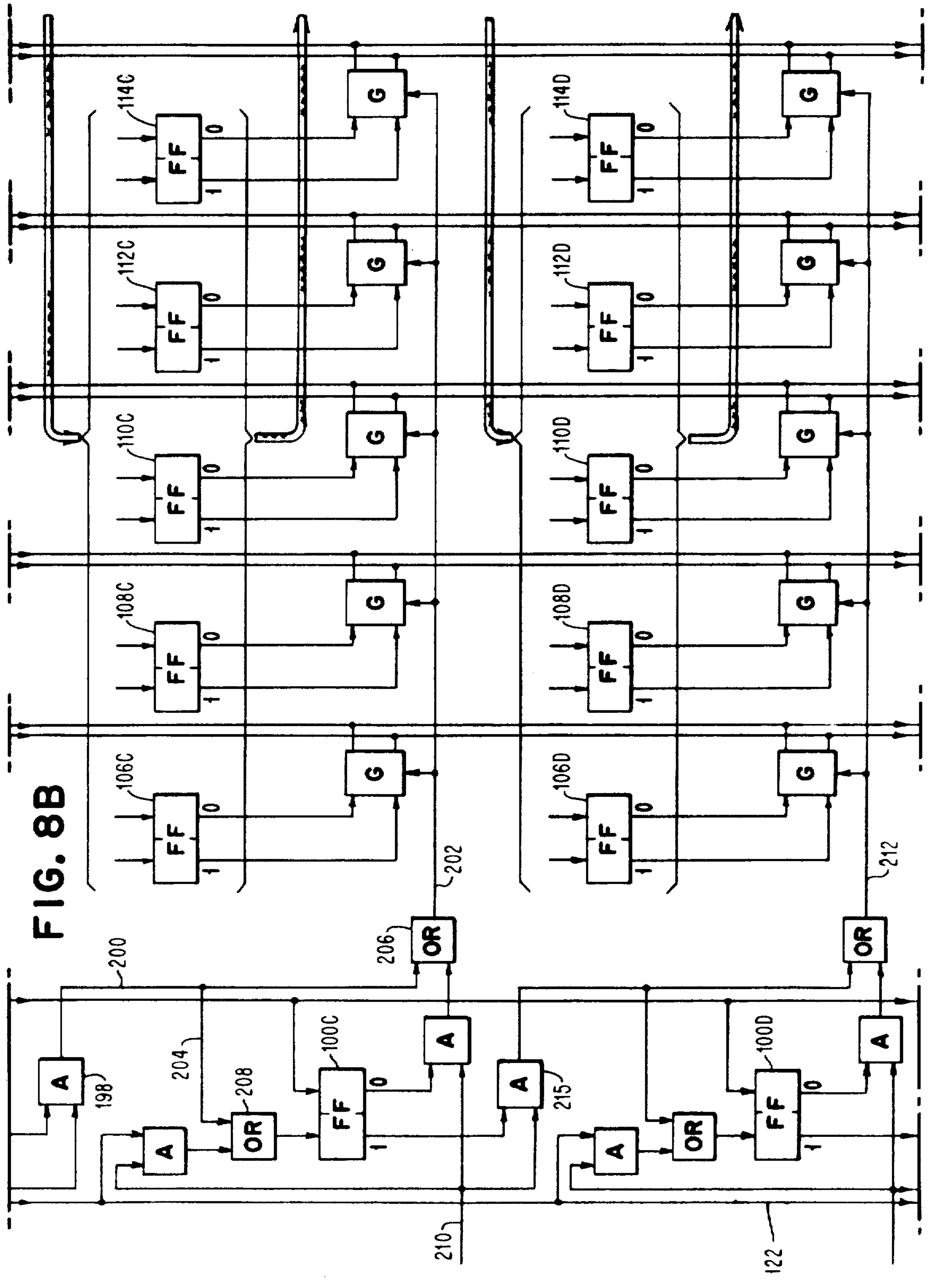
Figure 8C:
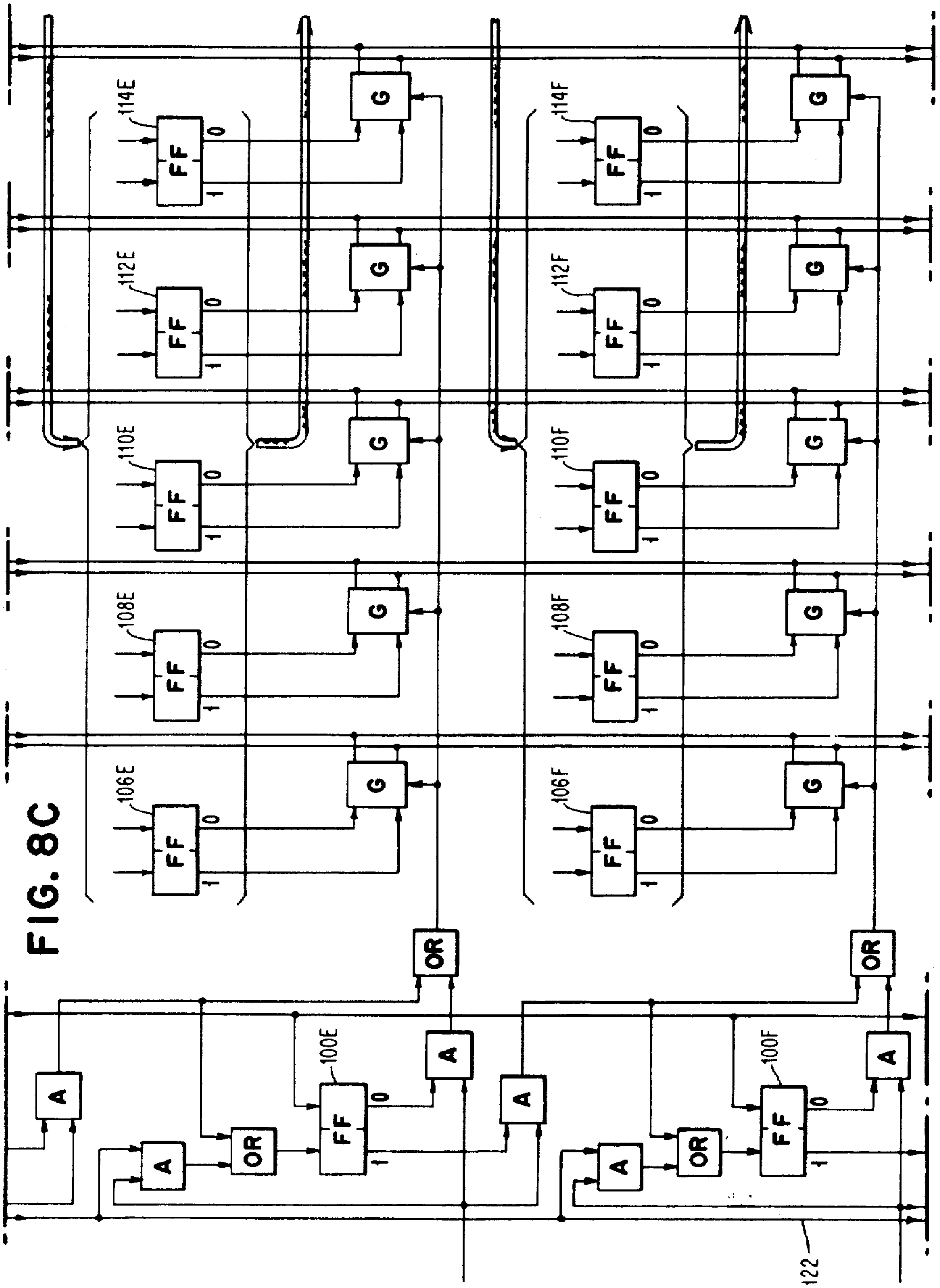
Figure 8D:
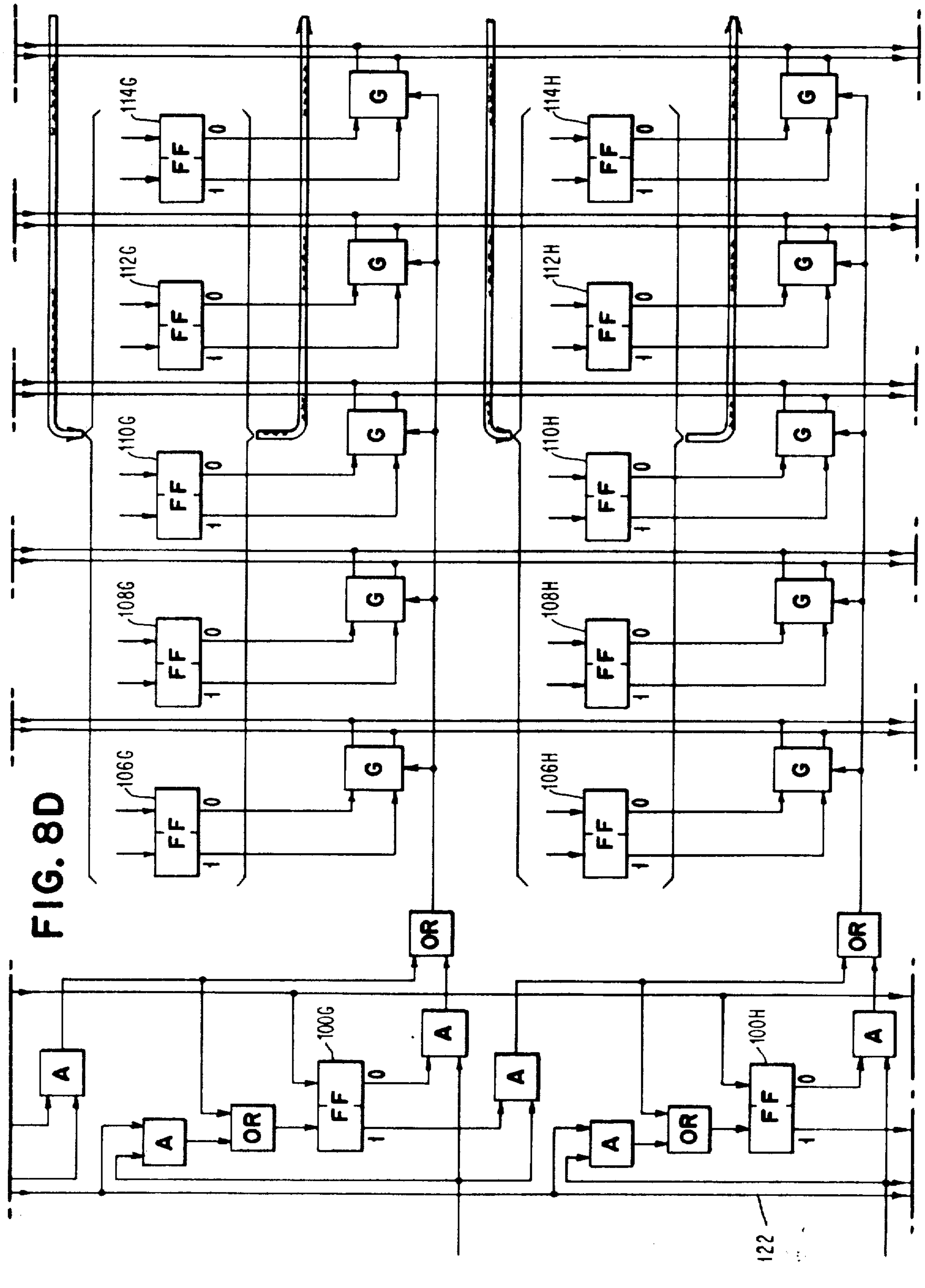
Figure 8E:
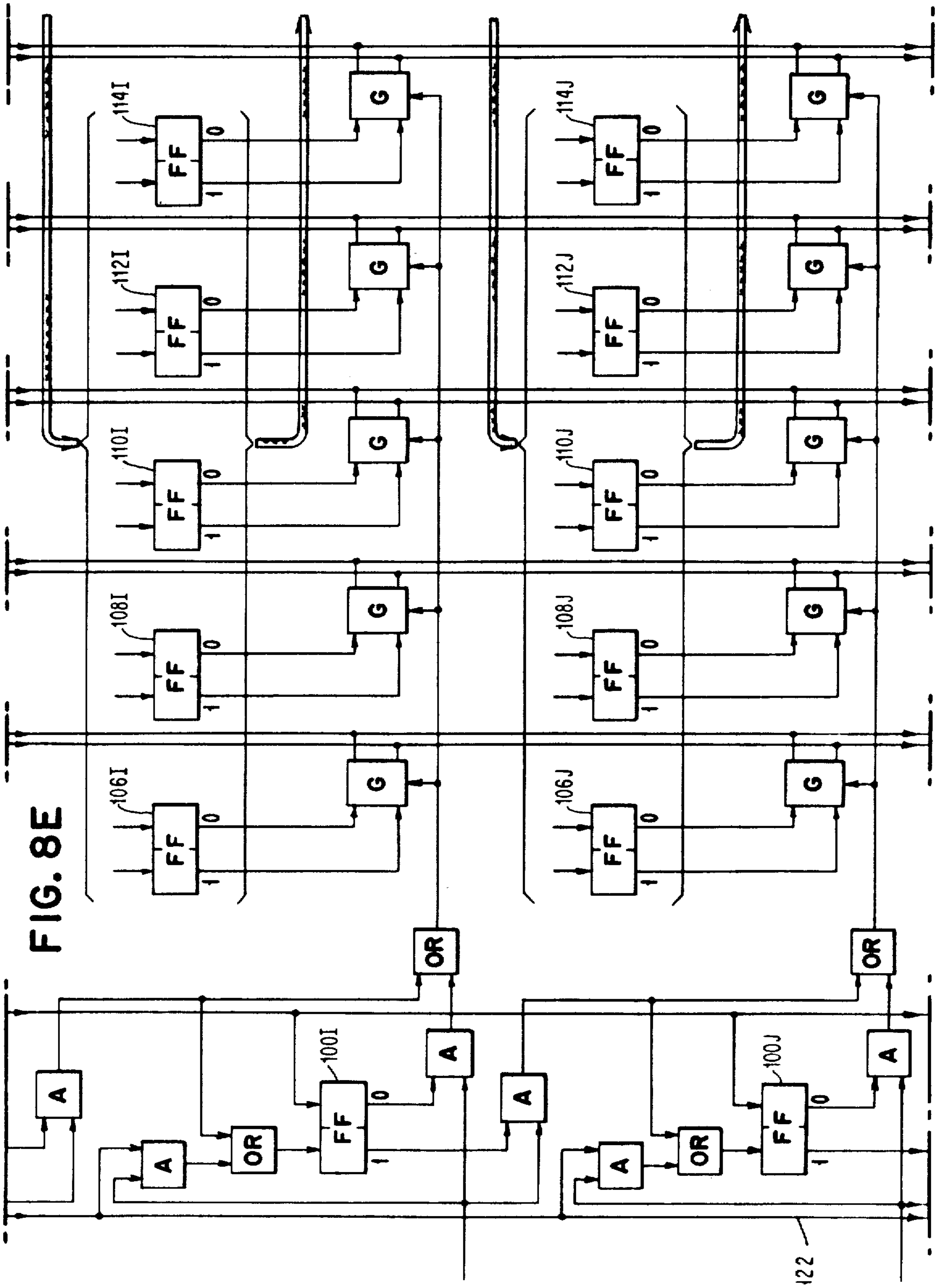
Figure 8F:
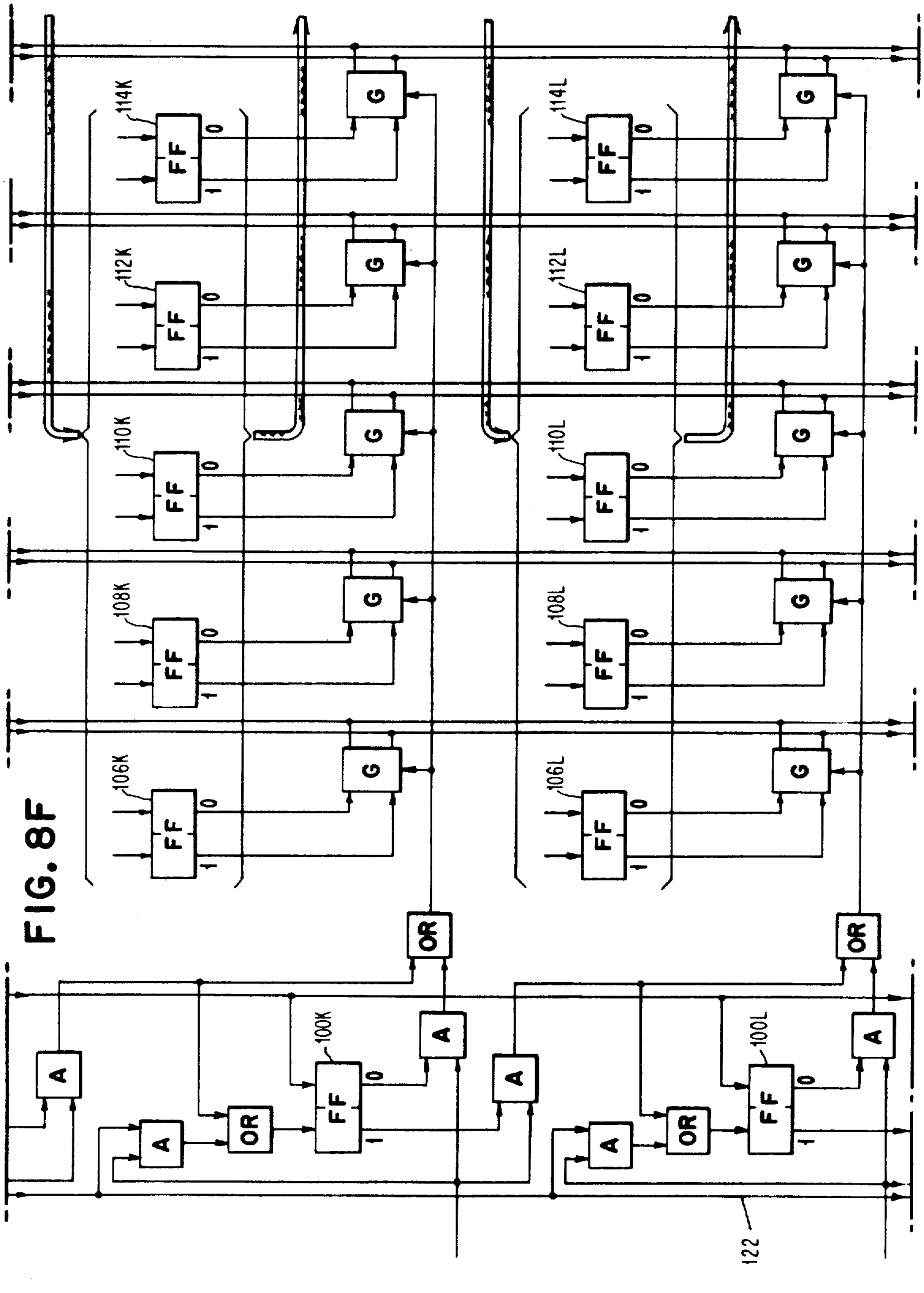
Figure 8G:
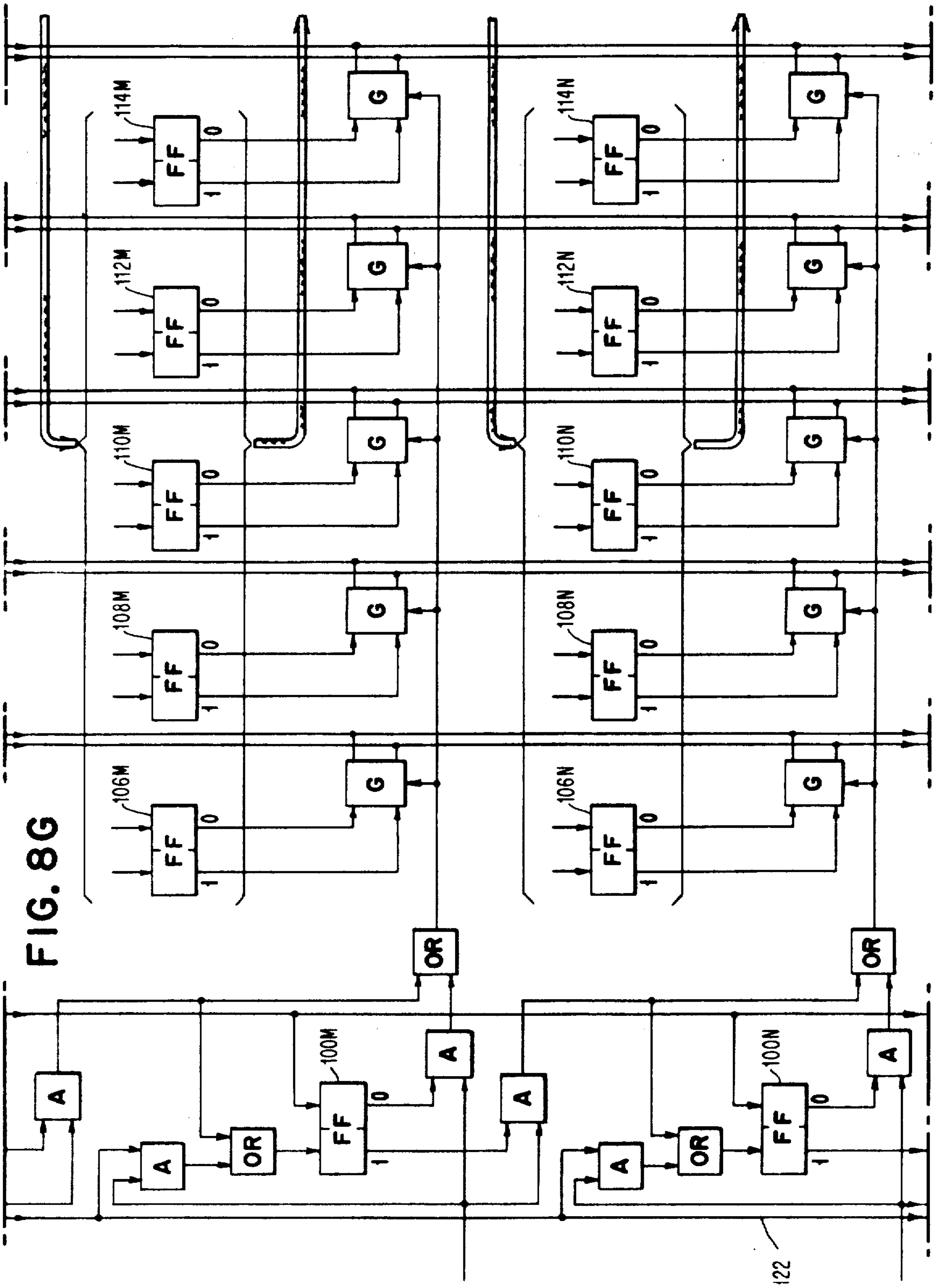
Figure 8H:
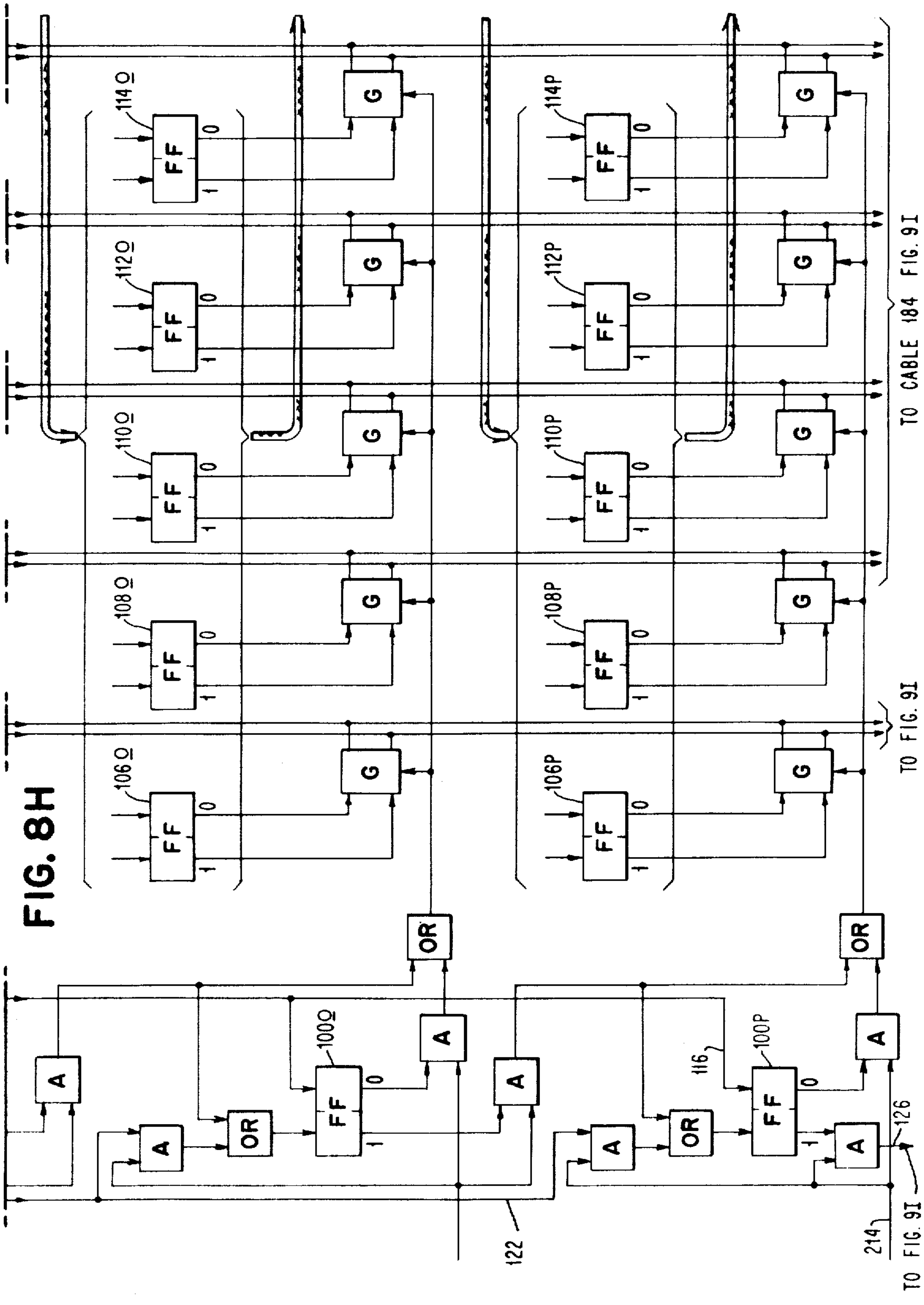
Figure 9G:
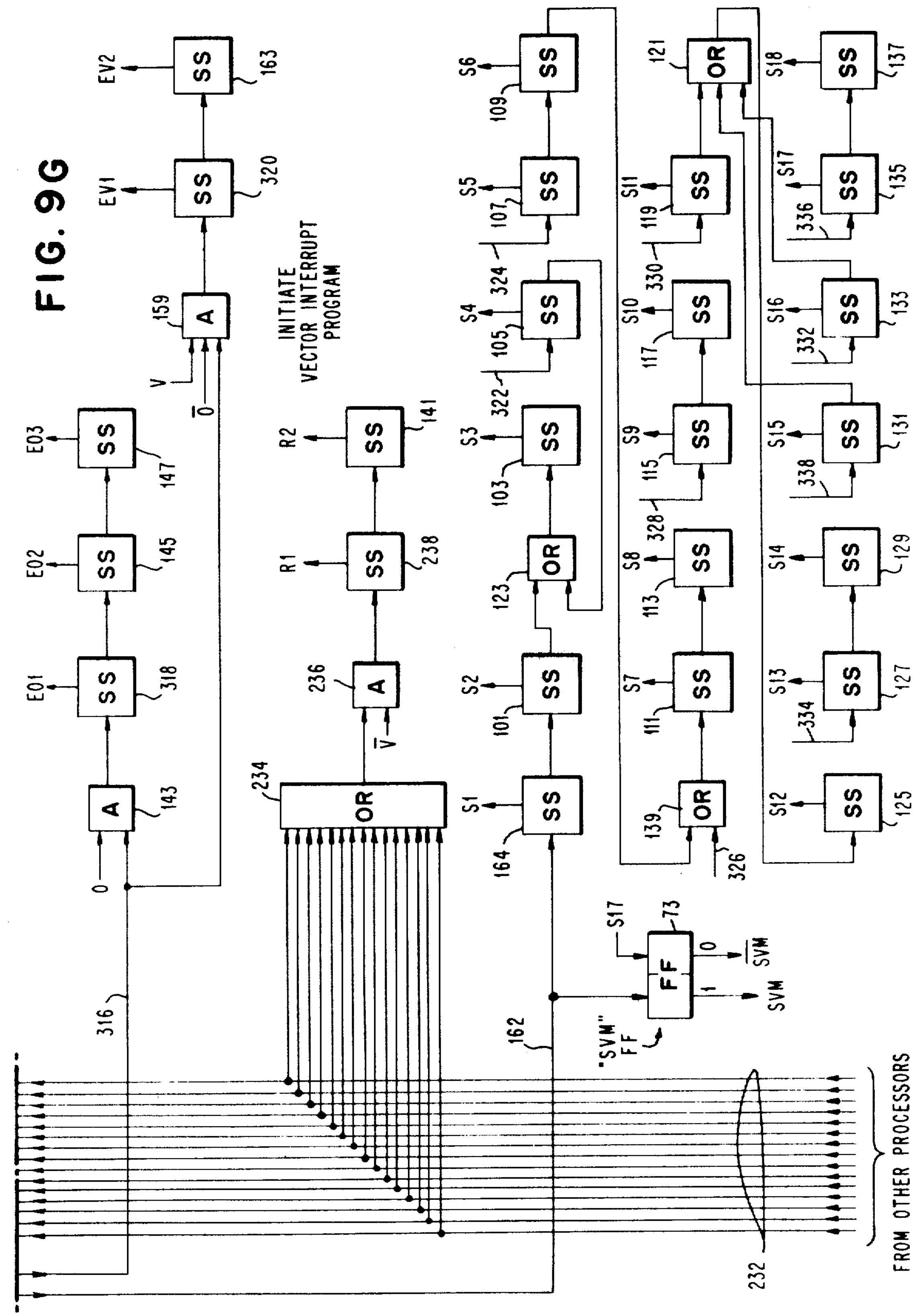
Figure 9H:
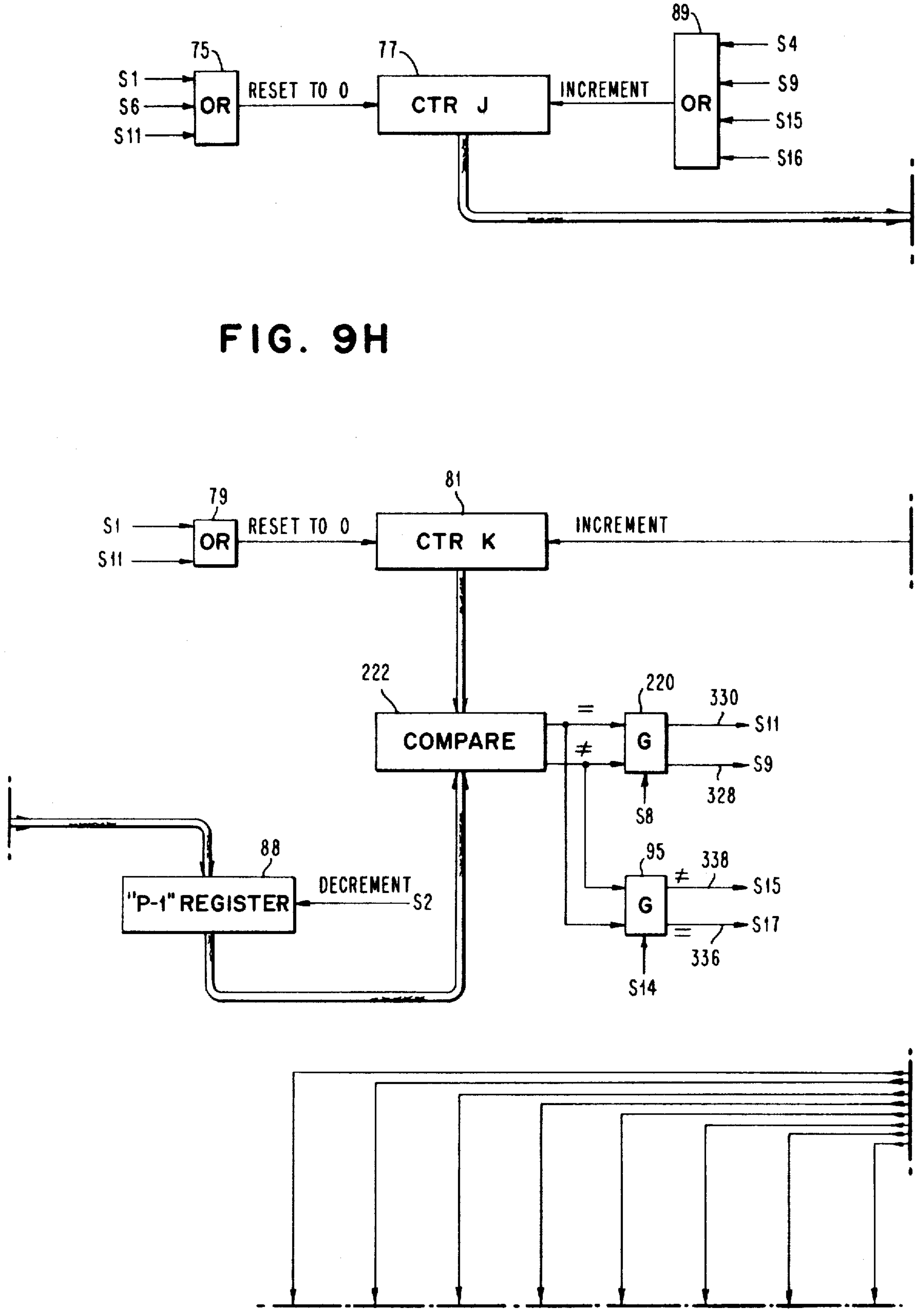

Upon the initiation of the operation of the S clock, a monostable multivibrator 164 is actuated to produce pulse S1. The latter pulse is applied through an OR circuit 75 to a counter 77, legended counter J, such application of pulse S1 clearing counter 77, i.e., setting it to all zeros (FIG. 9H). Pulse S1 is also applied through an OR circuit 79 to a counter 81, legended counter K, to reset the latter to all zeros. Pulse S1 is applied to the X counter 168 to reset it to all zeros (FIG. 9D), to gate 174 (FIG. 9E) in order to gate the "P" field of instruction register 63 to the (P–1) register (FIG. 9H), through an OR circuit 155 to a gate 176 (FIG. 9E) to gate the address field of instruction register 63 to M register 83 (FIG. 9E), to a line 116 (FIG. 9I) in order to set the 100A–100P flips-flops (FIGS. 8A–8H) to their "0" states and through an OR circuit 142 (FIG. 9E) to switch the validity bit of instruction register 63 to its "0" state. Upon the termination of pulse S1, a monostable multivibrator 101 is triggered.

Pulse S2 performs the following operations: It is applied to the "P–1" register 88 (FIG. 9H) in order to decrement it by one. It is applied to a gate 178 (FIG. 9D) to gate the contents of X counter 168 (now containing zero) to the X register 180. Register 180 is a normal index register which is employed for address modification, i.e., there is either added or subtracted therein from the contents of the address field of instruction register 63.

Figure 9I:
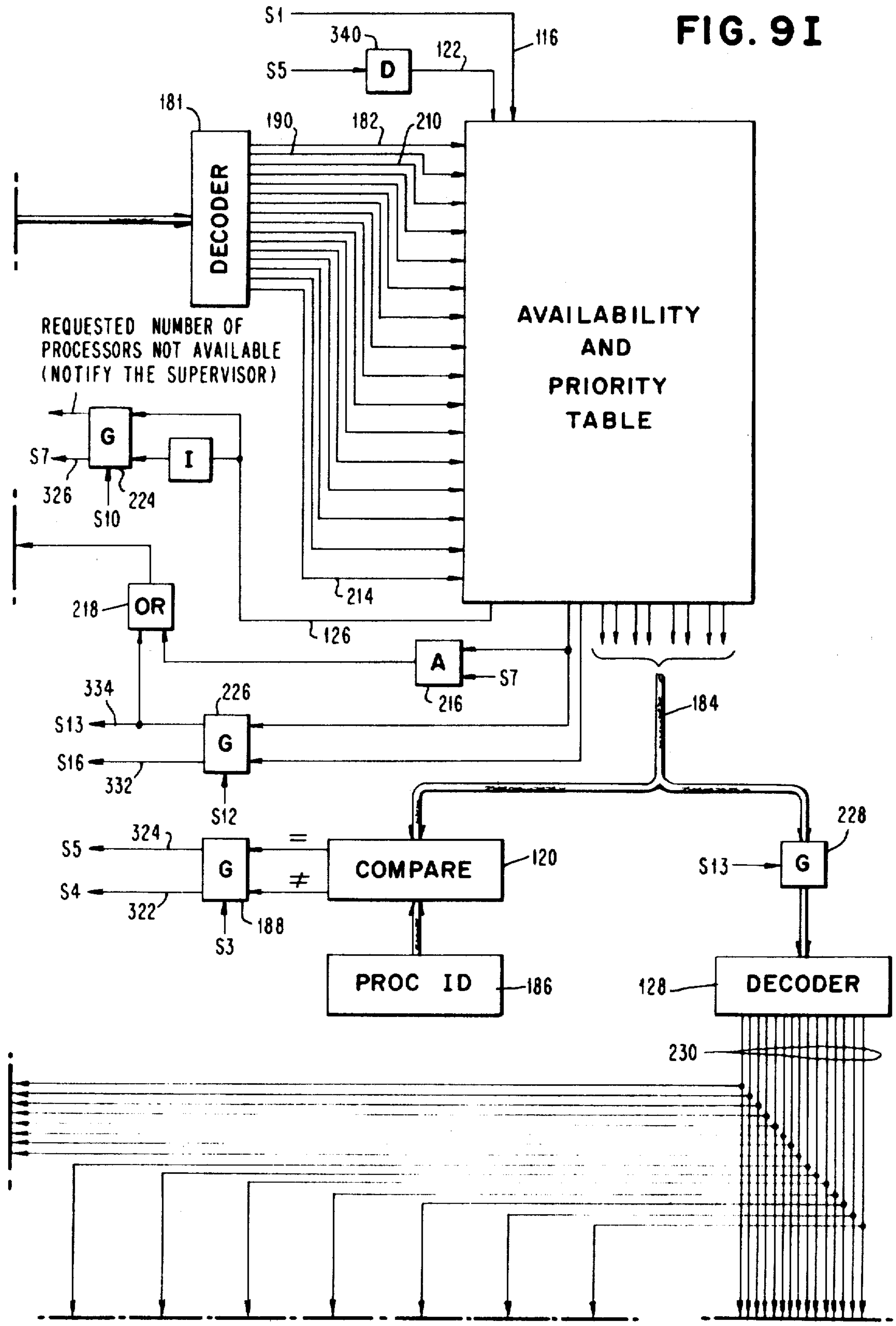

As shown in FIG. 9H, the contents of J counter 77 are applied to a decoder 181 (FIG. 9I). Since, at this juncture, the contents of counter J are zero, having been set to that state by pulse S1, an output line 182 of decoder 181 becomes active, line 182 also being shown in FIG. 8A.

There now occurs the operation of searching the availability and priority table for the identification number of the originating processor. It is recalled that flip-flops 108A, 110A, 112A, and 114A (FIG. 8A) contain the identification number of the lowest priority processor. It is necessary to compare the originating processor's identification number which is held in register 186 (FIG. 9I), legended processor ID, with each row in the availability and priority table until a match is found, such comparison being carried through sequentially.

With line 182 active, the processor identification number that is in the topmost row of the table (FIGS. 8 and 8A–8H), appears on a cable 184 (FIG. 9I) which extends to a compare unit 120. The originating processor's identification number is contained in the Proc ID register 186 (FIG. 9I), register 186 also being connected to compare unit 120.

Upon the termination of pulse S2, a monostable multivibrator 103 in the S clock is actuated through an OR circuit 123. Pulse S3 is employed to test the output of compare unit 120 and to this end, it is applied to a gate 188. If the output of compare unit 120, upon the comparison of the originating processor's identification number and the number contained in the availability and priority table, shows equality, then an output appears on output line 324 of gate 188 (FIG. 9I), the latter output being applied to trigger a monostable multivibrator 107 in the S clock to product pulse S5. However, if the output of compare unit 120 shows inequality, then an output appears on output line 322 of gate 188, the latter output being applied as an actuating input to a monostable multivibrator 105 in the S clock to produce pulse S4.

Let it be assumed that the output of compare unit 120 shows inequality. In such situation, the S4 pulse is produced, the latter pulse being employed to increment the J counter 77 (FIG. 9H) through an OR circuit 89. Upon such incrementation of counter 77, an output appears on line 190 (FIGS. 9I and 8A). It is to be noted that upon the termination of the S4 pulse, monostable multivibrator 103 is actuated through OR circuit 123. In other words, the S clock continues to branch back from the S4 to the S3 pulse outputs until equality occurs at the output of compare unit 120 at which time the S clock branches to monostable multivibrator 107 to produce the S5 pulse.

If it were to be assumed that an output was present on line 190 at the time that equality occurred at the output of compare unit 120, the application of pulse S5 to line 122 through a delay unit 340 (FIG. 9I), because of the inclusion of an AND circuit 192 (FIG. 8A) which is enabled by the output on line 190, would permit the S5 pulse to be passed through an OR circuit 194 (FIG. 8A) to set flip-flop 100B to its "1" state. The latter setting will cause an AND circuit 198 (FIG. 8A) to be enabled and an AND circuit 196 to be disabled. Consequently, the output present on line 190 will now be passed through AND circuit 198 to a line 200 (FIG. 8B) which extends through an OR circuit 206 to a line 202. The output on line 190 will also be applied through a line 204 (FIG. 8B) and an OR circuit 208 to set flip-flop 100C to its "1" state. Thus, thereafter, when an output appears on line 190, such output will be shunted to line 202 and away from the row of flip-flops comprising flip-flops 106B, 108B, 110B and 112B, thereby removing the B flip-flops from the table. Also, thereafter, whenever an output appears on line 210 (FIG. 8B), such output will pass through an AND circuit 215 and appear on a line 212. In the latter situation, flip-flop 100D is set to its "1" state in a sequence of events similar to that described hereinabove which resulted in the setting of flip-flop 100C to its "1" state.

It is readily appreciated from an examination of FIGS. 8 and 8A–8H that this setting of the flip-flops 100 can be propagated all the way to the 100P flip-flop if a sequence of outputs appear on the lines below 210 in FIGS. 8 and 8A–8H and that the output on line 214 (FIG. 8H) will appear on line 126 (FIG. 8H) after such a sequence of output pulses.

Once the entry in the availability and priority table which corresponds to the identification number of the originating processor has been ascertained, the originating processor must next determine if there are sufficient available processors to carry out the vector mode operation by testing, one after another, the flip-flops 106 (FIGS. 8 and 8A–8H). If a flip-flop 106 is in the "1" state, the processor whose number is in the rightmost flip-flops 108, 110, 112 and 114 of the same row is available for vectoring. The number of available processors is counted in counter K (FIG. 9H).

To this end, the pulse S6 output of a monostable multivibrator 109 in the S clock which is actuated at the termination of the S5 pulse and is applied through OR circuit 75 (FIG. 9H) to reset the contents of the J counter 77 to "0." Therefore, it is possible to begin a new scan of the availability and priority table, as represented in latches 100, 106, 108, 110, 112 and 114, from the top to the bottom. Initially, line 182 (FIG. 9I) receives an output from decoder 181. Upon the termination of pulse S6, monostable multivibrator 111 is actuated through an OR circuit 139, the resulting pulse S7 output therefrom being applied to an AND circuit 216 (FIG. 9I) to ascertain whether the flip-flop 106 whose output is gated by the signal on line 182 (this will be either 106A (FIG. 8A) if flip-flop 100A is in the "0" state or 106B if flip-flop 100A is in the "1" state) is in its "1" state. If it is, AND circuit 216 will be enabled to produce an output which passes through an OR circuit 218 to increment the K counter 81. At the termination of pulse S7, a monostable multivibrator 113 is actuated. Pulse S8 is applied to a gate 220 (FIG. 9H) to test the output of a compare unit 222, compare unit 222 having applied thereto the contents of K counter 81 and the contents of (P–1) register 88. If the output of compare unit 222 at this juncture shows equality, then an output will appear on output line 330 of gate 220 to actuate a monstable multivibrator 119 to produce pulse S11. If the output of compare unit 222, however, shows inequality, then an output will appear on output line 328 of gate 220 to actuate a monstable multivibrator 115 to produce pulse S9.

In the case of inequality, pulse S9 is applied to OR circuit 89 to increment counter 77, i.e., counter J. Thus, the scan of the availability and priority table continues. At this point, it is necessary to ascertain whether counter 77 is at its upper range. If it is at such upper range, an output will appear on output line 214 (FIG. 9I) of decoder 181 and such output will be applied to the availability and priority table and exit therefrom on line 126. Thus, if an output is present on line 126, it is recognized that the space has been exhausted in the table and that the requested number of processors is not available.

Upon the termination of pulse S9, a monostable multivibrator 117 is actuated to produce pulse S10, pulse S10 being applied to a gate 224 (FIG. 9I) to test whether or not an output is present on line 126. If such output is not present, then an output will appear on output line 326 of gate 224, such output being applied to OR circuit 139 to actuate monostable multivibrator 111 and thereby produce pulse S7. Pulse S7 will test for the state of the next flip-flop in the 106 series in the table (FIGS. 8, 8A–8H) to learn whether it is in its "1" state. If such flip-flop is in its "1" state, the K counter 81 will be incremented. Thereafter, upon the termination of pulse S7, multivibrator 113 will be actuated to thereby produce pulse S8, whereby pulse S8 will be able to be employed to test the output of compare unit 222 it will be determined whether or not the contents of counter 81, i.e., counter K, are equal to the contents of register 88, i.e., the (P–1) register. With this arrangement, the available processors for participation in the vector mode operation are counted to ascertain as to whether there are enough of them to carry out the vector operation.

During the scan of the availability and priority table (FIGS. 8, 8A–8H), whenever an output is applied to a row of flip-flops 100, 106, 108, 110, 112 and 114, for which flip-flop 100 is in the "1" state but flip-flop 100 is the next lower row is in the "0" state, then flip-flop 100 in the next lower row will be set to "1." This propagation of the setting of flip-flops 100 was described hereinabove.

Let it be assumed that there are sufficient processors to participate in the carrying out of the vector operation. In such contingency, an output will appear on output line 330 of gate 220 to actuate a monostable multivibrator 119 to produce pulse S11. Pulse S11 is applied through OR circuit 79 to reset the contents of K counter 81 to "0" and through OR circuit 89 to reset the contents of J counter 77 to "0." In addition, pulse S11 is employed to set to the "1" states all of the flip-flops of the "other processors" register 93 (FIGS. 9J and 9K) and is applied through an OR circuit 91 to increment X counter 168 (FIG. 9D). As will be explained in greater detail, X counter 168 will be incremented each time a processor is assigned to the vector mode whereby each assigned processor will have a different index in its X register 180 (FIG. 9D).

At this point, it becomes necessary to again go through the availability and priority table and assign available processors for participation in the vector mode of operation. The assignment is made from lowest priority to highest priority available processor. Thus, when pulse S11 terminates, a monostable multivibrator 125 is actuated through an OR circuit 121 to produce pulse S12. Pulse S12 is employed to test the states of the 106 flip-flops in the availability and priority table (FIGS. 8 and 8A–8H). If such testing shows that a flip-flop 106 is in its "1" state, counter 81 is incremented through gate 226 and OR circuit 218 and an output appears on output line 334 of gate 226. However, if the flip-flop 106 is in the "0" state, then an output appears on output line 332 of gate 226 which is employed to actuate a multivibrator 133 to produce pulse S16. Thus, as an available processor is found, the S clock branches to pulse S13, which is applied to gate 228 (FIG. 9I) whereby an output appears on one of lines 230 as determined by the action of decoder 128 upon the processor number represented by the signals on lines 184. The line 230, upon which the latter output appears, extends to that processor which has the identification number that is applied to decoder 128. In the latter, i.e., the receiving processor of the active line 230, the output will appear on one of lines 232 (FIG. 9G), such output passing through an OR circuit 234, an AND circuit 236 provided that the receiving processor is not at that instant in the vector mode of operation, to actuate a monostable multivibrator 238 to thereby produce the pulse R1 therefrom. The events which occur in the receiving processor upon being designated as a participating processor through the action of decoder 128 is described further hereinbelow.

The line of lines 230 on which the output had appeared as a result of the action of decoder 128, resets to the "0" state one of the flip-flops in the "other processors" register 93. In this manner, the originating processor keeps track of the processors which will participate with it in the vector mode of operation. The assigning of the available processors to the vector mode operation, as immediately described hereinabove, is repeated as many times as is necessary to provide the proper number of participating processors to work with the originating processor. The proper number will be recognized as having been assigned because, at that time, the contents of counter 81 will agree with the contents of register 88 as determined by compare unit 222 (FIG. 9H). The latter comparison is effected at the termination of pulse S13 whereby a monostable multivibrator 129 is actuated to produce S14. Pulse S14 is applied to a gate 95. It is readily understood that if there are still processors to be assigned to the vector mode of operation, compare unit 222 will find inequality whereby output will appear on output line 338 of gate 95. The output on line 338 is employed to actuate a monostable multivibrator 131 of the S clock to produce pulse S15, pulse S15 being applied through OR circuit 89 to increment J counter 77 (FIG. 9H) and also being applied through OR circuit 91 (FIG. 9D) to increment X counter 168. As will be explained in greater detail, X counter 168 is incremented each time a processor is assigned whereby each assigned processor will have a different index in its X register 180 (FIG. 9D).

As has been mentioned hereinabove, when a flip-flop 106 is tested by the S12 pulse, i.e., the latter pulse is applied to gate 226, if the latter flip-flop is in the "0" state, an output appears on output line 332 of gate 226 to actuate a monostable multivibrator 133 to produce pulse S16. Pulse S16 is applied through OR circuit 89 to increment J counter 77 (FIG. 9H), and at the termination of pulse S16, monostable multivibrator 125 is actuated through OR circuit 121 (FIG. 9G) to produce pulse S12, in order that the next row in the table can be examined for an available processor.

In the last pass through the availability and priority table, when the contents of counter 81 agree with the contents of the "P–1" register 88, an output appears on output line 336 of gate 95 (FIG. 9H) whereby a monostable multivibrator 135 of the S clock is actuated to produce puse S17. As seen in FIG. 9B, pulse S17 is employed to set a flip-flop 97, the vector mode flip-flop to its "1" state, and as shown in FIG. 9C, it is also employed to set a flip-flop 99, i.e., the originating processor flip-flop, to its "1" state.

Upon the termination of pulse S17, a monostable multivibrator 137 is actuated to produce S18, the latter pulse being employed to effect a transfer to the starting address of the first instruction in the vecor mode of operation, as shown in FIG. 9A and FIG. 7 (branch to M).

There follows immediately hereinbelow a description of the events which ensue in a receiving processor, i.e., a participating processor which is not the originating processor, which has just been assigned to the vector mode of operation by the originating processor.

When a receiving processor is assigned to the vector mode by an originating processor, monostable multivibrator 238 is actuated through an AND circuit 236 (FIG. 9G), AND circuit 236 being enabled since the V flip-flop 97 of the receiving processor has not yet been set. The pulse output R1 of monostable multivibra or 238 is applied to a gate 149 (FIG. 9D) to gate the contents of the bus to the X (hold) register 151, the purpose of this gating step being to save the index number of the receiving processor which has to be employed when the latter processor is in the vector mode of operation. Upon the termination of pulse R1, a monostable multivibrator 141 is actuated to produce pulse R2. Pulse R2 is employed to initiate the "vector interrupt" program which puts the current task which the receiving processor is at present executing back onto the task queue. This process of interrupting a program currently in execution to perform a special operation is standard in computer technology. It usually involves waiting for completion of the current instruction, then saving the Instruction Counter contents and perhaps other vital data at a reserved location in storage, loading the Instruction Counter with the address in storage of a program that performs the operations desired to handle the particular situation created by the interrupt condition. The last instruction of the "vector interrupt" program is a special instruction whose sole functions are to set flip-flop 97, the V flip-flop (FIG. 9B), to the "1" state and to open gate 354 (FIG. 9D) to effect the transfer of the index number from X (hold) register 151 to X register 180. The setting of the "V" flip-flop disables AND circuit 130 (FIG. 9E) whereby a non-originating participating processor is prevented from causing an instruction fetch. Only an originating processor or a non- participating processor can effect such fetch. The instruction following the aforementioned special instruction that ends the "vector interrupt" program will be fetched from storage, but it cannot be executed. The normal means by which the next instruction is executed is as follows. At the end of execution of the present instruction, the "End of E Cycle" pulse arrives on line 152 (FIG. 9E), passing through OR circuit 69 and resetting E flip-flop 67. The reset output of that flip-flop passes through AND circuit 154 (FIG. 9F), said circuit being enabled by the $\overline{V}$ signal which is present when flip-flop 97, the V flip-flop, is in its "0" state. When the V flip-flop is in the "1" state, AND circuit 154 is disabled, and the following sequence leading to the execution of the next instruction cannot occur. The output of AND circuit 154 passes through OR circuit 156 and AND circuit 158, said AND circuit being enabled when the validity bit in Instruction Register 63 (FIG. 9E) is in its "1" state, said state signifying that the Instruction Register contains an instruction that can be used next. The output of AND circuit 158 is applied to differentiating circuit 160, causing it to emit a pulse that passes through OR circuit 71, the outputs of which open gates 134 and 136, causing the operation code field and the address field of the Instruction Register to be sent to the decoder 138 and the execution mechanism, respectively, allowing execution of the next instruction to proceed.

As demonstrated hereinabove, the normal execution sequence is inhibited when the V latch of a participating processor is in its "1" state.

Referring back to the S clock of the originating processor, it is noted that the pulse S18 output of monostable multivibrator 137 is employed to reset flip-flop 67, i.e., the "E" flip-flop (FIG. 9E), through OR circuit 69 to its "0" state. Since the "V" flip-flop, i.e., flip-flop 97 in FIG. 9B, in the originating processor has been set to its "1" state, AND circuit 154 (FIG. 9F) is disabled. However, AND circuit 240 is enabled because the "O" flip-flop 99 is in its "1" state. With such arrangement, the reset output of the "E" flip-flop 67 is applied as one input to an AND circuit 242.

The output of AND circuit 242 can start the sequence of events leading to the execution of the instruction in the Instruction Register; however, during vector mode operation, it is desired that all participating processors working on the same vectoring problem start their execution cycles simultaneously. For this reason, it is desired to delay the output of AND circuit 242 until all processors have completed the execution of their "vector interrupt" instruction sequence. Thus, as each non-originating participating processor completes the special instruction (which sets the V flip-flop of the processor) that ends its "vector-interrupt" program, its "E" flip-flop is reset to the "0" state. The reset output of the "E" flip-flop then is passed through an AND circuit 132 (FIG. 9F) and is broadcast to all of the other processors on respective lines 244. One of these lines communicates with the originating processor, it being one of the lines of group 246 shown in FIG. 9K.

Figure 9J:
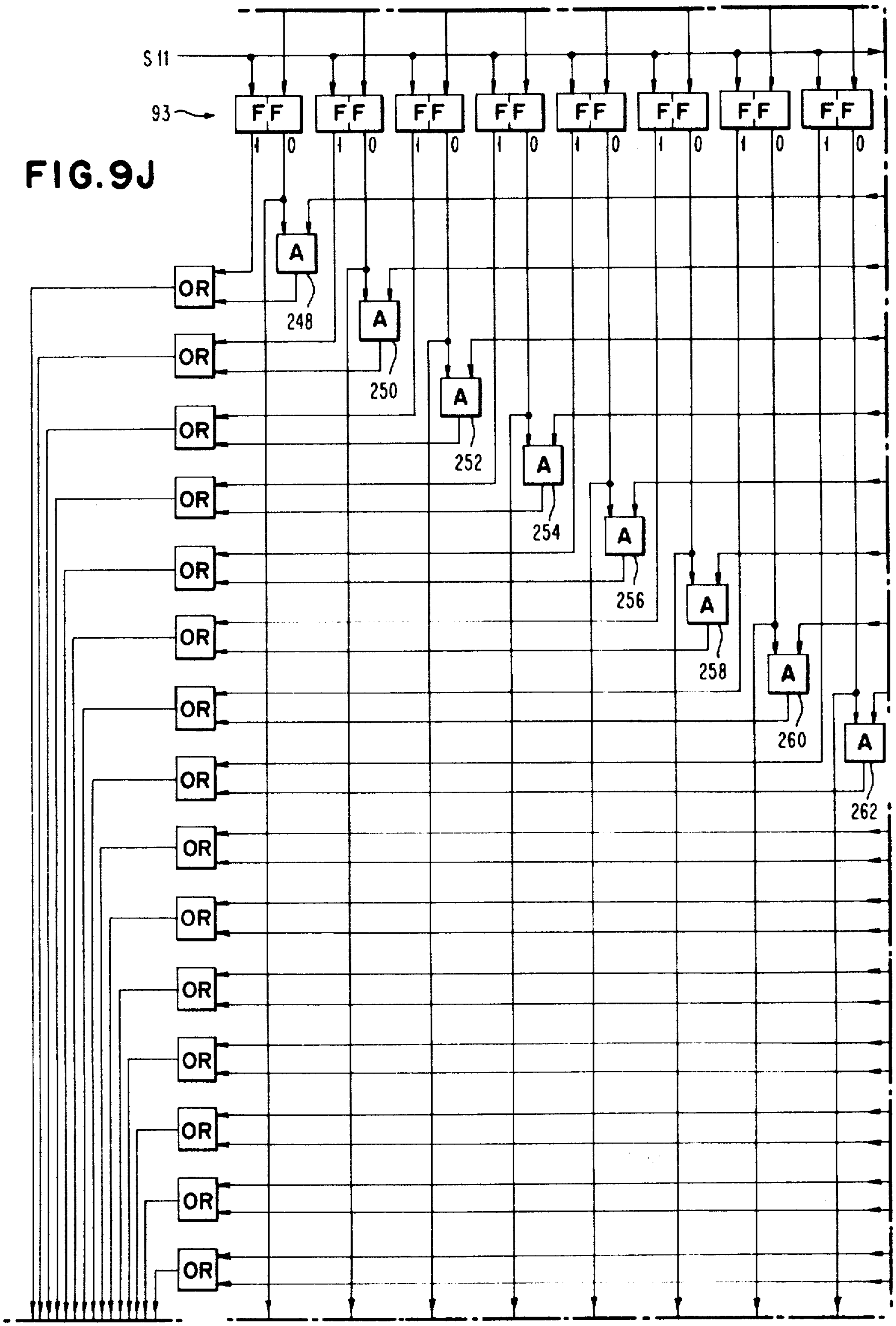
Figure 9K:
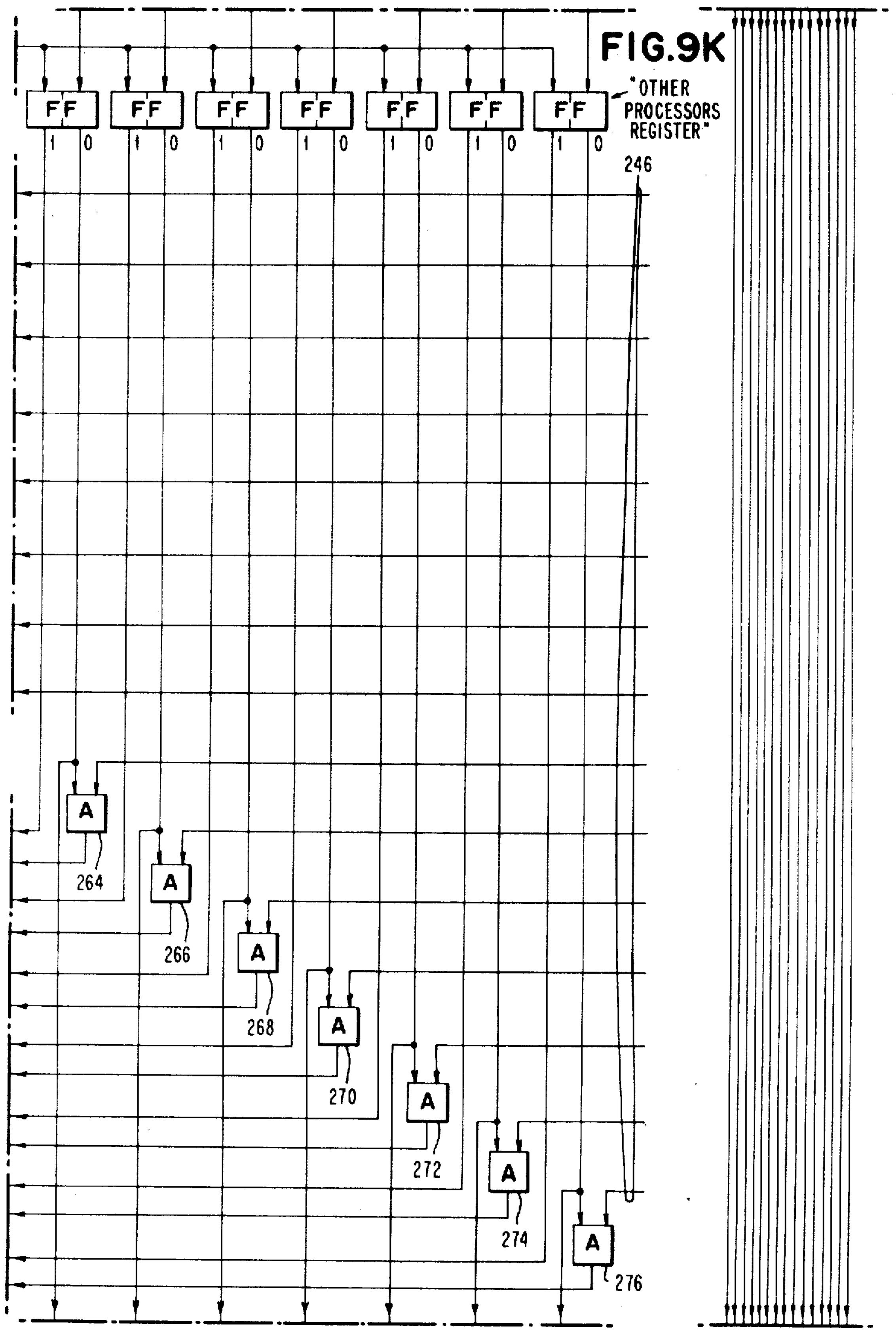

Each originating processor keeps track of the processors that have been assigned by it to work in the vector mode of operation by respectively resetting the pertinent flip-flops in the "other processors" register 93 (FIGS. 9J, 9K) to the "0" state. The resetting of a flip-flop in register 93 to its "0" state enables an associated AND circuit in the group of AND circuits 248–276 (FIGS. 9J and 9K). The respective operations of the latter AND circuits permit only the processors which have been assigned by the originating processor to the vector mode of operation to signal the end of their vector-interrupt execution cycle to AND circuit 242 (FIG. 9F) in the originating processor. It is to be noted that each flip-flop in register 93 which has been left in its "1" state supplies a steady input to AND circuit 242. With this arrangement, AND circuit 242 has an output when the originating processor has completed its execution cycle and when all processors assigned by it to the vector mode of operation have completed their execution cycles.

In the originating processor, if the validity bit of the INSTRUCTION REGISTER (FIG. 9E) is in its "1" state the output of AND circuit 242 will pass through OR circuit 156, enable AND circuit 158 and appear at differentiating circuit 160. Differentiating circuit 160 will produce an output, i.e., a pulse, which is applied through OR circuit 71 to gates 134 and 136, such gating effecting the transfer of the operation code (OP) from instruction register 63 to decoder 138 and to gate the address of the data to the execution mechanism. Thus, an execution cycle is initiated in the originating processor.

Figure 9L:
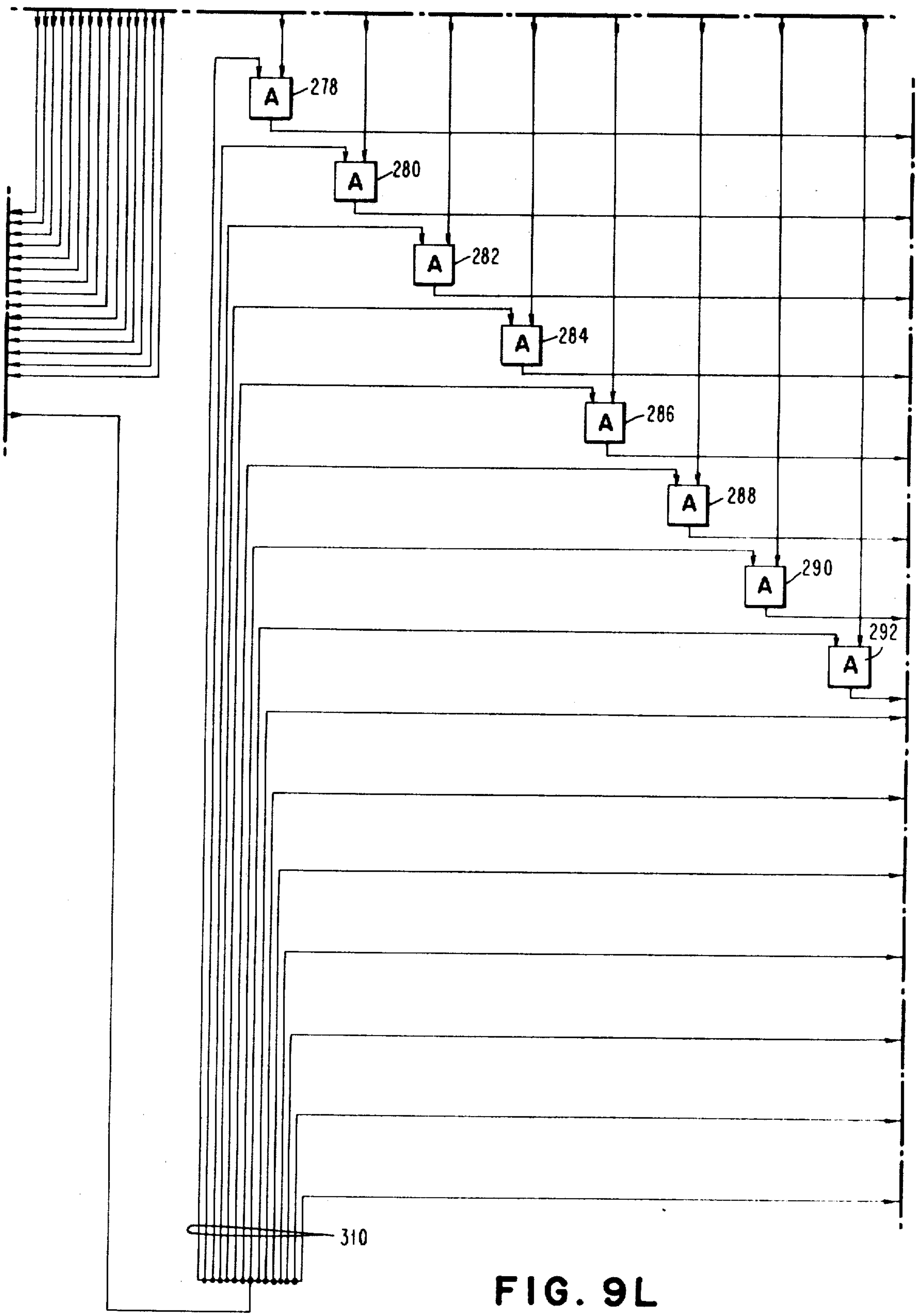
Figure 9M:
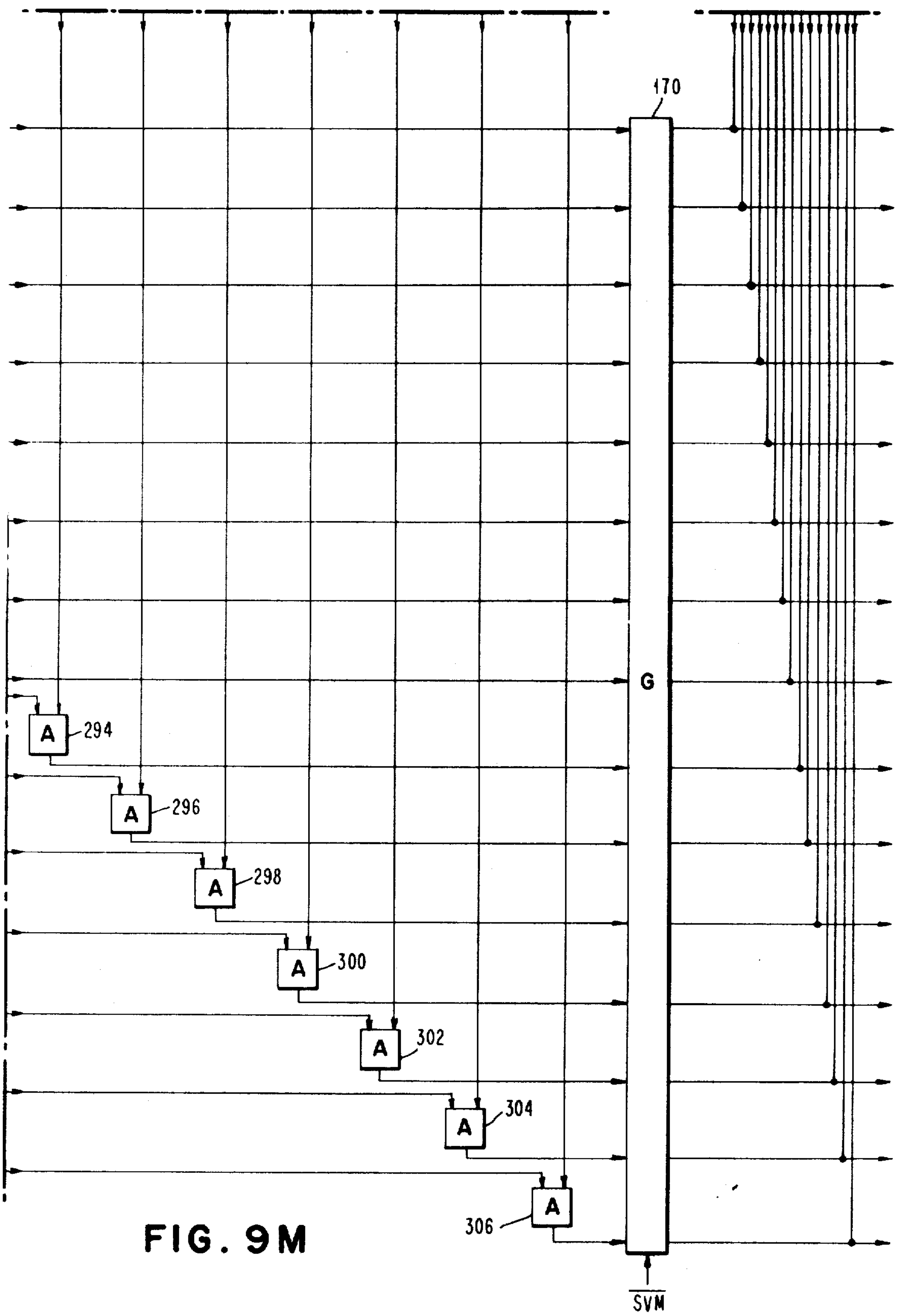

It is to be noted that the output of differentiating circuit 160 also enables an AND circuit 308 in the originating processor because the "O" flip-flop is in its "1" state, the ouptput of AND circuit 308 being applied to a group of lines 310 (FIG. 9L). Only the processors which have been assigned to the vectoring operation, i.e., those flip-flops in register 93 ("other processors" register), which are in their "0" states, will receive the signal output from AND circuit 308 since the AND circuits 278–306 (FIGS. 9L and 9M) are enabled by those flip-flops in register 93. In each non-originating but participating processor, a signal appears on one of lines 232 (FIG. 9G). This signal passes through an OR circuit 312 (FIG. 9F) and enables an AND circuit 314 to provide input to gates 134 and 136 through OR circuit 71. In this manner, all of the participating processors and the originating processor are caused to start their execution cycles of the vector mode operation instructions at the same time.

The pattern of operation when executing the vector program can be seen easily. The originating processor receives instructions from the instruction fetch mechanism on lines 148 (FIG. 9E). The instruction signals pass through gate 150 and into Instruction Register 63, from where it is sent by way of gate 350 to lines 172, which go to all processors. Gate 350 is enabled in the originating processor when it begins the vector program. Non-originating vectoring processors accept the instructions transmitted by the originating processor from lines 172 through gate 352, which is enabled in all vectoring non-originating processors.

There follows now, the description of the sequence of operations which ensue when an "end vector mode" instruction is encountered. This sequence in the originating processor differs from the one that occurs in the non-originating participating processor. The sequence in the originating processor is first described.

In this latter connection, referring to FIG. 9F, in an originating processor, an output appears on an output line 316 of decoder 138 as determined by the operation code in instruction register 63 and decoder 138. Line 316 is applied to a monostable multivibrator 318 through an AND circuit 143, circuit 143 being enabled by the presence of the "1" state of the O flip-flop in the originating processor. Upon actuation, monostable multivibrator 318 produces pulse EO1. Pulse EO1 is applied to gate 176 (FIG. 9E) through OR circuit 155 to gate the contents of the "address" field of instruction register (IR) 63 to the M register 83. Upon the termination of pulse EO1, a monostable multivibrator 145 is actuated to produce pulse EO2. Pulse EO2 is employed to reset the "O" flip-flop, i.e., flip-flop 99 (FIG. 9C), to its "0" state. Upon the termination of pulse EO2, a monostable multivibrator 147 is actuated to produce pulse EO3, pulse EO3 being utilized to cause a transfer to the starting address of subroutine B as shown in FIG. 7, by making use of interruption techniques that are well-known in the art. In subroutine B, the availability and priority table is restored to memory and the interlock is reset. Subroutine B makes use of special instructions for all intents and purposes identical to "store register" type instructions that are well-known in the art (e.g., STO for IBM 7090). The only difference is that the source registers for the special instructions are the "availability and priority registers" of FIG. 8. The 1st instruction in subroutine B is a "branch to M." The M register 83 contains the address of the first instruction to be executed after the vector mode of operation has been completed.

In a non-originating participating processor, in the "end vector mode" instruction execution, the pulse appearing on line 316 will enable an AND circuit 159 to cause the actuation of a monostable multivibrator 320 to thereby produce pulse EV1. Pulse EV1 is employed to reset flip-flop 97, i.e., the vector mode flip-flop, through an OR circuit 161 (FIG. 9B). Upon the termination of the EV1 pulse, a monostable multivibrator 163 is actuated to produce pulse EV2. The EV2 pulse will cause the participating non-originating processor to transfer to the beginning of a supervisory routine that will select a task from the task queue for this processor and cause the processor to execute the next instruction to be executed of that task.

The following tabulation sets forth the relationship of the operations under the control of the S (Switch-to-Vector Mode) clock.

| Step number | Conditions for activation | Functions | Successor step |
|---|---|---|---|
| S1 | Decoding of an SVM instruction | Resets contents of counter J to "0." Resets contents of counter K to "0." Resets contents of X counter to "0." Gates P field of instruction register (IR) to (P-1) register. Gates address field of instruction register to M register. Resets line 116. Resets validity bit of instruction register (IR) to "0." | S2. |
| S2 | End of S1 | Decrements (P-1) register. Gates contents of X counter to X register. | S3. |
| S3 | End of S2<br>End of S4 | Tests the output of compare unit 120 | S4, if inequality. S5, if equality. |
| S4 | End of S3 | Increments counter J | S3. |
| S5 | End of S3 | Activates line 122 | S6. |
| S6 | End of S5 | Resets counter J to "0" | S7. |
| S7 | End of S6 | Tests flip-flop 106 | S8. |
| | End of S10 | If flip-flop at "1," increments counter K | |
| S8 | End of S7 | Tests the output of compare unit 222 | S9, if inequality. S11, if equality. |
| S9 | End of S8 | Increments counter J | S10. |
| S10 | End of S9 | Tests for state of line 126 | If line 126 is inactive, S7. If line 126 is active, notify supervisor that the requested number of processors is not available. |
| S11 | End of S8 | Resets contents of counter K to "0." Resets contents of counter J to "0." Increments X counter. Sets "other processors" register to all "1's." | S12. |
| S12 | End of S11<br>End of S15<br>End of S16 | Tests flip-flop 106 | S16, if at "0". S13 if at "1." while incrementing counter K. |
| S13 | End of S12 | Gates states of flip-flops 108, 110, 112 and 144 to decoder 128. | S14. |
| S14 | End of S13 | Tests output of compare unit 222 | S15, if inequality. S17, if equality. |
| S15 | End of S14 | Increments counter J. Increments X counter | S12. |
| S16 | End of S12 | Increments counter J | S12. |
| S17 | End of S14 | Resets "SVM" flop-flip to "0." Sets V flip-flop to "1." Sets 0 flip-flop to "1." | S18. |
| S18 | End of S17 | Branch to M. Resets E flip-flop to "0" | |

The following tabulation sets forth the relationship of the operations under the control of the R (receive sequence) clock.

| Step number | Conditions for activation | Functions | Successor step |
|---|---|---|---|
| R1 | Assignment of a participating processor to vector mode operation | Gates bus to "X Hold" register | R2. |
| R2 | End of R1 | Initiates "vector interrupt" program which places current task on system task queue. The last instruction of this program sets the V flip-flop to "1." The setting of the V flip-flop disables AND circuit 154. With this arrangement, a non-originating participating processor is prevented from executing any further instructions until signalled to do so by an originating processor. | |

The following tabulation sets forth the relationship of the operations under the control of the EO (end vector mode, originating processor only) clock.

| Step number | Conditions for activation | Functions | Successor step |
|---|---|---|---|
| EO1 | Activation of line 316 | Gates address field of instruction register (IR) to register M | EO2. |
| EO2 | End of EO1 | Resets O flip-flop to "0." Resets V flip-flop to "0" | EO3. |
| EO3 | End of EO2 | Transfer to starting address of subroutine B | |

The following tabulation sets forth the relationship of the operations under the control of the EV (end vector mode, non-originating participating processor only) clock.

| Step number | Conditions for activation | Functions | Successor step |
|---|---|---|---|
| EV1 | Activation of line 316 | Resets V flip-flop to "0" | EV2. |
| EV2 | End of EV1 | Causes processor to resume uninterrupted or idle state which it was in prior to having been made a participating processor. | |

While the invention has been particularly shown and described with reference to a preferred embodiment thereof, it will be understood by those skilled in the art that various changes in form and details may be made therein without departing from the spirit and scope of the invention.

What is claimed is:

1. In an arrangement in a multiprocessing system, which includes a set of processors normally executing programs independently and a set of memory modules accessible to said processors, capable of effecting a transition to the vector mode of operation of a specifiable number of said processors which are functioning in a normal mode of operation comprising:

means contained in each of said processors for enabling them to be switched from the normal mode to the vector mode, and from the vector mode to the normal mode of operation, said means comprising:

means responsive to a vector mode initiating instruction in a program that a processor is currently executing for designating said last-named processor as the originating processor for said vector mode of operation, means responsive to the designating of a processor as the originating processor for selecting a set of other processors and for placing these selected processors into said vector operating mode, said other processors being thereby designated as participating processors, interrupt means responsive to the placing of a processor in the vector mode of operation as a participating processor for causing such processor to halt its normal mode execution of its current task and to store the state of said task in a form that renders it susceptible to resumption by a processor at a later time, means operative upon the placing of said set of processors into said vector mode of operation for causing the processor designated as the originating processor to fetch the vector mode instructions and for transmitting said instructions to the other participating processors of said set, and terminating means responsive to the fetching of the last instruction of the vector mode of operation for removing said set of processors from said mode, the originating processor of said set being enabled thereby to continue the execution of its program in the normal mode of operation, the other participating processors of said set being enabled thereby to be assigned other and generally unrelated tasks for execution in the normal mode of operation.

2. An arrangement as defined in claim 1 wherein each of said processors includes indexing means and means responsive to said vector mode initiating instruction for preparing unique indices in said indexing means of each processor.

3. An arrangement as defined in claim 2 wherein each of said set of processors in said system are all provided with a unique identifying number.

4. An arrangement as defined in claim 3 wherein means are included for storing a table of the identifying numbers of all of the processors of said system in an ascending order of assigned priority and respective means associated with each of the stored identifying numbers for indicating the availability of a given processor for a vector mode operation.

5. An arrangement as defined in claim 4 wherein each of said processors contains means for storing its identifying number and means responsive to the designating of a processor as the originating processor indicating the removal of its availability for a vector mode operation other than the one for which it is the originating processor.

6. An arrangement as defined in claim 5 wherein each of said processors contains means responsive to the designating of it as an originating processor for determining whether there are sufficient available processors required as participating processors to complete said set.

7. An arrangement as defined in claim 1 wherein said interrupt means includes means responsive to the designation of a processor as a participating processor for disabling such processor from effecting instruction fetches in said vector more of operation.

8. An arrangement as defined in claim 1 wherein each of said processors further includes synchronizing means responsive to the passing of one or several prespecified points in the execution cycle of each of the participating processors, said synchronizing means enabling the processor designated as an originating processor to ascertain when all participating processors have passed said points in their respective execution cycles during the vector mode of operation.

9. An arrangement in a multiprocessing system which includes a number of processors normally executing programs independently, memory means and a task queue, said arrangement effecting a transition to the vector mode of operation of a selectable set of said processors which are functioning in a normal mode of operation comprising:

means contained in each of said processors in said set for enabling them to be respectively switched from the normal to the vector mode, and from the vector mode to the normal mode of operation, said means comprising:

means responsive to a vector mode initiating instruction in a program that a processor is currently executing for designating said last-named processor as the originating processor for said vector mode of operation, means responsive to the designating of a processor as the originating processor for causing said processor and the other of the processors of said set to be placed into said vector operating mode, said other processors being thereby designated as participating processors, interrupt means responsive to the placing of a processor in the vector mode of operation as a participating processor for causing such processor to halt its normal mode execution of its current task and to store the state of said task in said task queue, means operative upon the placing of said set of processors into said vector mode of operation for causing the processor designated as the originating processor to fetch the vector mode operation instructions and for providing said instructions to the other and participating processors of said set, and terminating means responsive to the fetching of the last instruction of the vector mode of operation for removing said set of processors from said mode, the originating processor of said set being enabled thereby to continue the execution of its program in the normal mode of operation, the participating processors of said set being enabled thereby to be assigned tasks from said queue for normal mode of operation execution;

interaction controlled means respectively associated with each of said processors for enabling intercommunication therebetween; and a common bus to which said controllers are connected for effecting said intercommunication.

10. An arrangement for effecting a transition to vector mode of operation of a selectable set of processors which are functioning in a normal mode of operation in a multiprocessing system which includes said set of processors, other processors, a memory and a task queue comprising:

means contained in each of said processors in said set for enabling them to be respectively switched from the normal to the vector, and from the vector to the normal modes of operation, said means comprising:

means responsive to a vector mode operation initiating instruction in a program that a processor is currently executing for designating said last-named processor as the originating processor for said vector mode of operation, means responsive to the designating of a processor as the originating processor for causing said processor and the other of the processors of said set to be placed into said vector operating mode, said other processors being thereby designated as participating processors, interrupt means responsive to the placing of a processor in the vector mode of operation as a participating processor for causing such processor to halt its normal mode execution of its current task and to store the state of said task in said task queue, means operative upon the placing of said set of processors into said vector mode of operation for causing the processor designated as the originating processor to fetch the vector mode operation instructions and for providing said instructions to the other and participating processors of said set, and terminating means responsive to the fetching of the last instruction of the vector mode of operation for removing said set of processors from said mode, the originating processor of said set being enabled thereby to continue the execution of its program in the normal mode of operation, the participating processors of said set being enabled thereby to be assigned tasks from said queue for normal mode of operation execution;

instruction bus means for broadcasting instructions from an originating processor to participating processors; and a communication network between said processors and said memory for fetching instructions from said memory and storing instructions in said memory.

11. An arrangement for effecting a transition to vector mode of operation of a selectable set of processors which are functioning in a normal mode of operation in a multiprocessing system which includes said set of processors, other processors, a memory and a task queue comprising:

means contained in each of said processors in said set for enabling them to be respectively switched from the normal to the vector, and from the vector to the normal modes of operation, said means comprising:

means responsive to a vector mode operation initiating instruction in a program that a processor is currently executing for designating said last-named processor as the originating processor for said vector mode of operation, means responsive to the designating of said processor as the orginating processor for causing said processor and the other of the processors of said set to also be placed into said vector operating mode, said other processors being thereby designated as participating processors, interrupt means responsive to the placing of a processor in the vector mode of operation as a participating processor for causing such processor to halt its normal mode execution of its current task and to store the state of said task in said task queue, means operative upon the placing of said set of processors into said vector mode of operation for causing the processor designated as the originating processor to fetch the vector mode operation instructions and for providing said instructions to the other and participating processors of said set, and terminating means responsive to the fetching of the last instruction of the vector mode of operation for removing said set of processors from said mode, the originating processor of said set being enabled thereby to continue the execution of its program in the normal mode of operation, the participating processors of said set being enabled thereby to be assigned tasks from said queue for normal mode of operation execution;

a first broadcast bus interconnecting said processors and connected to said memory for broadcasting instructions from an originating processor to participating processors; and a second broadcast bus interconnecting said processors and connected to said memory for broadcasting data from an originating processor to participating processors.

12. An arrangement for effecting a transition to vector mode of operation of a selectable set of processors which are functioning in a normal mode of operation in a multiprocessing system which includes said set of processors, other processors and a task queue comprising:

means contained each of said processors in said set for enabling them to be switched from the normal to the vector, and from the vector to the normal modes of operation, said means comprising:

means responsive to a vector mode operation initiating instruction in a program that a processor is currently executing for designating said last-named processor as the originating processor for said vector mode of operation, means responsive to the designating of a processor as the originating processor for causing said processor and the other of the processors of said set to be placed into said vector operating mode, said other processors being thereby designated as participating processors, interrupt means responsive to the placing of a processor in the vector mode of operation as a participating processor for causing such processor to halt its normal mode execution of its current task and to store the state of said task in said task queue, means operative upon the placing of said set of processors into said vector mode of operation for causing the processor designated as the originating processor to fetch the vector mode operation instructions and for providing said instructions to the other and participating processors of said set, and terminating means responsive to the fetching of the last instruction of the vector mode of operation for removing said set of processors from said mode, the originating processor of said set being enabled thereby to continue the execution of its program in the normal mode of operation, the participating processors of said set being enabled thereby to be assigned tasks from said queue for normal mode of operation execution;

a first broadcast bus interconnecting said processors and connected to said memory for broadcasting instructions from an originating processor to participating processors;

a first control line associated with said first broadcast bus which is activated in response to the broadcasting of an instruction by an originating processor to activate the participating processors for the receiving of said instruction;

a second broadcast bus interconnecting said processors and connected to said memory for broadcasting data from an originating processor to participating processors; and a second control line associated with said second broadcast bus which is activated in response to the broadcasting of data by an originating processor to activate the participating processors for the receiving of said data.

13. An arrangement as defined in claim 9 wherein said memory means comprises a single bank of memory modules, each of said modules being capable of storing both vectors of instructions and data words.

14 An arrangement as defined in claim 9 wherein said memory means comprises a plurality of banks of memory modules, a first of said modules being operative to store instruction vectors, a second of said modules being operative to store data vectors.

15. An arrangement as defined in claim 9 wherein the processors of said multiprocessing system constitute a plurality of sets and said memory means also constitute a plurality of sets and said memory means also constitute a plurality of sets of modules, a selected set of said processors communicating with a selected set of modules of said memory means.

16. An arrangement as defined in claim 9 wherein said memory means is operative as a common store for all of the processors of said system and wherein each of said processors comprises a local store communicating with said memory means for receiving vector task instructions and data from said memory means.

17. An arrangement for effecting a transition to vetor mode of operation of a selectable set of processors which are functioning in a normal mode of operation in a multiprocessing system which includes said set of processors, other processors, a memory and a task queue comprising:

means contained in each of said processors in said set for enabling them to be respectively switched from the normal to the vector, and from the vector to the normal modes of operation, said means comprising:

means responsive to a vector mode operation initiating instruction in a program that a processor is currently executing for designating said last-named processor as the originating processor for said vector mode of operation, means responsive to the designating of a processor as the originating processor for causing said processor and the other of the processors of said set to be placed into said vector operating mode, said other processors being thereby designated as participating processors, interrupt means responsive to the placing of a processor in the vector mode of operation as a participating processor for causing such processor to halt its normal mode execution of its current task and to store the state of said task in said task queue, means operative upon the placing of said set of processors into said vector mode of operation for causing the processor designated as the originating processor to fetch the vector mode operation instructions and for providing said instructions to the other and participating processors of said set, and terminating means responsive to the fetching of the last instruction of the vector mode of operation for removing said set of processors from said mode, the originating processor of said set being enabled thereby to continue the execution of its program in the normal mode of operation, the participating processors of said set being enabled thereby to be assigned tasks from said queue for normal mode of operation execution;

a broadcasting arrangement for the broadcasting and the fetching of instruction and operand words; and a communication network between said processors and said memory.

18. An arrangement as defined in claim 17 wherein each of said processors contains a storage register through which all traffic of instructions and operands thereto and therefrom is routed and which further comprises:

a first path from said storage register to said memory;

a second path to said memory from said storage module;

a broadcast bus;

a third path from said storage register to said bus; and a fourth path from said bus to said storage register.

19. An arrangement as defined in claim 17 wherein each of said processors contains an instruction register and a data register, and which further comprises:

an instruction broadcast bus;

an operand broadcast bus;

a first path from said instruction register to said instruction broadcast bus;

a second path from said instruction broadcast bus to said instruction register;

a third path from said data register to said operand broadcast bus;

a fourth path from said operand broadcast bus to said data register; and means for providing communication between said memory and said instruction and data registers.

20. An arrangement as defined in claim 17 which further includes a switch control for controlling communication between said memory and said processors;

respective access request lines from each of said processors to said switch control; and respective request accept lines from said switch control to each of said processors.

References Cited

UNITED STATES PATENTS

| | | |
|---|---|---|
| 3,308,436 | 3/1967 | Borck et al. |
| 3,312,951 | 4/1967 | Hertz. |
| 3,374,465 | 3/1968 | Richmond et al. |
| 3,419,849 | 12/1968 | Anderson et al. |
| 3,440,611 | 4/1969 | Falkoff et al. |

PAUL J. HENON, Primary Examiner

S. CHIRLIN, Assistant Examiner